United States Patent
Nishima et al.

(10) Patent No.: US 6,236,800 B1
(45) Date of Patent: May 22, 2001

(54) MAGNETIC RECORDING AND REPRODUCING APPARATUS

(75) Inventors: Ryou Nishima; Naoto Hirohata, both of Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/116,387

(22) Filed: Jul. 16, 1998

(30) Foreign Application Priority Data

Jul. 17, 1997 (JP) .................................................. 9-208588

(51) Int. Cl.$^7$ ...................................................... H04N 5/76
(52) U.S. Cl. ................................................ 386/46; 386/67
(58) Field of Search ................................ 386/46, 67, 68, 386/79, 113, 78; H04N 5/76

(56) References Cited

U.S. PATENT DOCUMENTS

| | | | |
|---|---|---|---|
| 3,663,766 | * 5/1972 | Goto | 386/78 |
| 4,796,104 | * 1/1989 | Ito et al. | 386/46 |
| 4,829,389 | * 5/1989 | Fukuda | 386/113 |
| 5,680,499 | 10/1997 | Choi . | |

FOREIGN PATENT DOCUMENTS

| | | |
|---|---|---|
| 0 671 722 | 9/1995 | (EP) . |
| 50-85316 | 7/1975 | (JP) . |
| 59-104706 | 6/1984 | (JP) . |
| 60-47103 | 4/1985 | (JP) . |
| 60-61905 | 4/1985 | (JP) . |
| 63-224005 | 9/1988 | (JP) . |
| 2-42602 | 2/1990 | (JP) . |
| 3-194701 | 8/1991 | (JP) . |
| 5-167977 | 7/1993 | (JP) . |
| 8-235551 | 9/1996 | (JP) . |
| 9-138924 | 5/1997 | (JP) . |
| 9-161201 | 6/1997 | (JP) . |

\* cited by examiner

Primary Examiner—Huy Nguyen
(74) Attorney, Agent, or Firm—Anderson, Kill & Olick P.C.

(57) ABSTRACT

A recording and reproducing apparatus has a rotary drum on which at least two rotary magnetic heads are mounted with 180 degree-symmetry to a center shaft of the drum. One of the magnetic heads has a magnetic gap set with an azimuth angle of 90 degrees or less in a clockwise direction to a track width direction on a magnetic tape. The other magnetic head has a magnetic gap set with an azimuth angle of 90 degrees or less in a clockwise direction to the track width direction. A video signal is sequentially and selectively recorded on the magnetic tape so that first tracks each corresponding to one picture video signal are repeatedly recorded on the magnetic tape while continuously travelling at a speed V/n in a first direction, and second tracks each corresponding to the one picture video signal are repeatedly recorded so that one of the second tracks is sandwiched between the two of the first tracks while the magnetic tape is continuously travelling at the speed V/n in a second direction opposite to the first direction, where V is a predetermined speed and n is a natural number. The video signal may be recorded while the magnetic tape is stopped after intermittent transfer by a distance corresponding to a two track-width in the first or the second direction.

10 Claims, 18 Drawing Sheets

MAGNETIC RECORDING AND REPRODUCING APPARATUS

BACKGROUND OF THE INVENTION

The present invention relates to a helical scanning type magnetic recording and reproducing apparatus for recording and reproducing signals with rotary magnetic heads on and from a magnetic tape during intermittent and continuous travelling in the forward and backward directions.

Helical scanning type magnetic recording and reproducing apparatuses record and reproduce signals with rotary magnetic heads on and from a magnetic tape wound around a drum assembly having an upper drum and a lower drum. This type of apparatuses have widely been used as a video tape recorder (VTR) or a video cassette recorder (VCR).

The helical scanning type magnetic recording and reproducing apparatus is provided with a pair of rotary magnetic heads for high density recording. The rotary magnetic heads have magnetic gaps with azimuth angels set as reverse to each other.

Recording is carried out with the rotary magnetic heads so that tracks are sequentially and alternately recorded on a magnetic tape such that the tracks are inclined to the longitudinal direction of the magnetic tape. A video signal for one field period is usually recorded or reproduced for each track on or from the magnetic tape.

The helical scanning type magnetic recording and reproducing apparatus have further been used as a monitoring apparatus with a TV camera for crime prevention. Such apparatus is usually a time-lapse type magnetic recording and reproducing apparatus that picks up a video signal for one field or one frame period per specific period of time from sequential video signals output by the TV camera. The time-lapse type magnetic recording and reproducing apparatus has widely been used in banks, supermarkets and convenience stores, etc.

The time-lapse type magnetic recording and reproducing apparatus uses a magnetic tape of a specific length. For long time recording, the magnetic tape is intermittently transferred at a speed corresponding to a normal reproduction for each specific period of time for recording still pictures from the sequential video signals.

Or, a video signal for each specific period of time may be recorded on the magnetic tape while stopped among the sequential video signals for still picture recording. The magnetic tape is transferred by a specific distance and stopped for next still picture recording.

Or, a video signal for each specific period of time may be recorded on the magnetic tape travelling at a slow speed among the sequential video signals for still picture recording.

The recording methods described above complete a recording operation to one magnetic tape when recording is completed from the beginning to end of the magnetic tape. For long time recording, the magnetic tape thus must be rewound to the beginning or exchanged to another one.

Japanese laid Open patent Nos. 50(1975)-85316 and 3(1991)-194701 disclose VTRs for reciprocating recording in both the forward and reverse directions. However, the VTR disclosed in the Japanese Laid-Open patent No. 50(1975)-85316 has many rotary heads. Further, this Laid-Open patent teaches variation of angle at which a magnetic tape is wound around a drum. The Laid-Open patent thus cause a problem of incompatibility to a standard VTR.

Further, the other VTR disclosed in the Japanese Laid-Open patent No. 3(1991)-194701 conducts reciprocating recording with a drum at a rotary speed two times or more the rotary speed for normal recording or reproduction, thus causing the complexity of circuitry when the VTR is assembled as a standard VTR.

Both VTRs are capable of recording video signals of full field, however, do not provide a time lapse recording function.

SUMMARY OF THE INVENTION

A purpose of the present invention is to provide an apparatus capable of continuous reciprocating recording with a function of time-lapse recording.

The present invention provides an apparatus comprising a rotary drum on which at least a first and a second rotary magnetic head are mounted with 180 degree-symmetry with respect to a center shaft of the rotary drum, the first rotary magnetic head having a magnetic gap set with an azimuth angle of 90 degrees or less in a clockwise direction with respect to a track width direction on a magnetic tape on which at least a video signal is to be recorded, and the second rotary magnetic head having a magnetic gap set with an azimuth angle of 90 degrees or less in an anticlockwise direction with respect to the track width direction; and a controller for sequentially and selectively recording at least the video signal on the magnetic tape to repeatedly record, by the first rotary magnetic head, first tracks each corresponding to one picture video signal on the magnetic tape while continuously travelling at a speed V/n in a first direction, and to repeatedly record, by the second rotary magnetic head, second tracks each corresponding to one picture video signal on the magnetic tape so that one of the second tracks is sandwiched between the two of the first tracks while the magnetic tape is continuously travelling at the speed V/n in a second direction opposite to the first direction, where V is a predetermined speed and n is a natural number.

Further, the present invention provides an apparatus comprising: a rotary drum on which at least a first and a second rotary magnetic head are mounted with 180 degree-symmetry with respect to a center shaft of the rotary drum, the first rotary magnetic head having a magnetic gap set with an azimuth angle of 90 degrees or less in a clockwise direction with respect to a track width direction on a magnetic tape on which at least a video signal is to be recorded, and the second rotary magnetic head having a magnetic gap set with an azimuth angle of 90 degrees or less in an anticlockwise direction with respect to the track width direction; and a controller for sequentially and selectively recording at least a video signal on the magnetic tape to repeatedly record, by the first rotary magnetic head, a track of the video signal on the magnetic tape while stopped after intermittent transfer by a distance corresponding to a two track-width in a first direction, and to repeatedly record, by the second rotary magnetic head, another track of the video signal on the magnetic tape while stopped after intermittent transfer by the distance in a second direction opposite to the first direction.

DETAILED DESCRIPTION OF PREFERRED EMBODIMENTS

Preferred embodiments according to the present invention will be described with reference to the attached drawings. Elements that are the same or analogous to each other are referenced by the same reference signs and numerals through the drawings.

Figure 1:
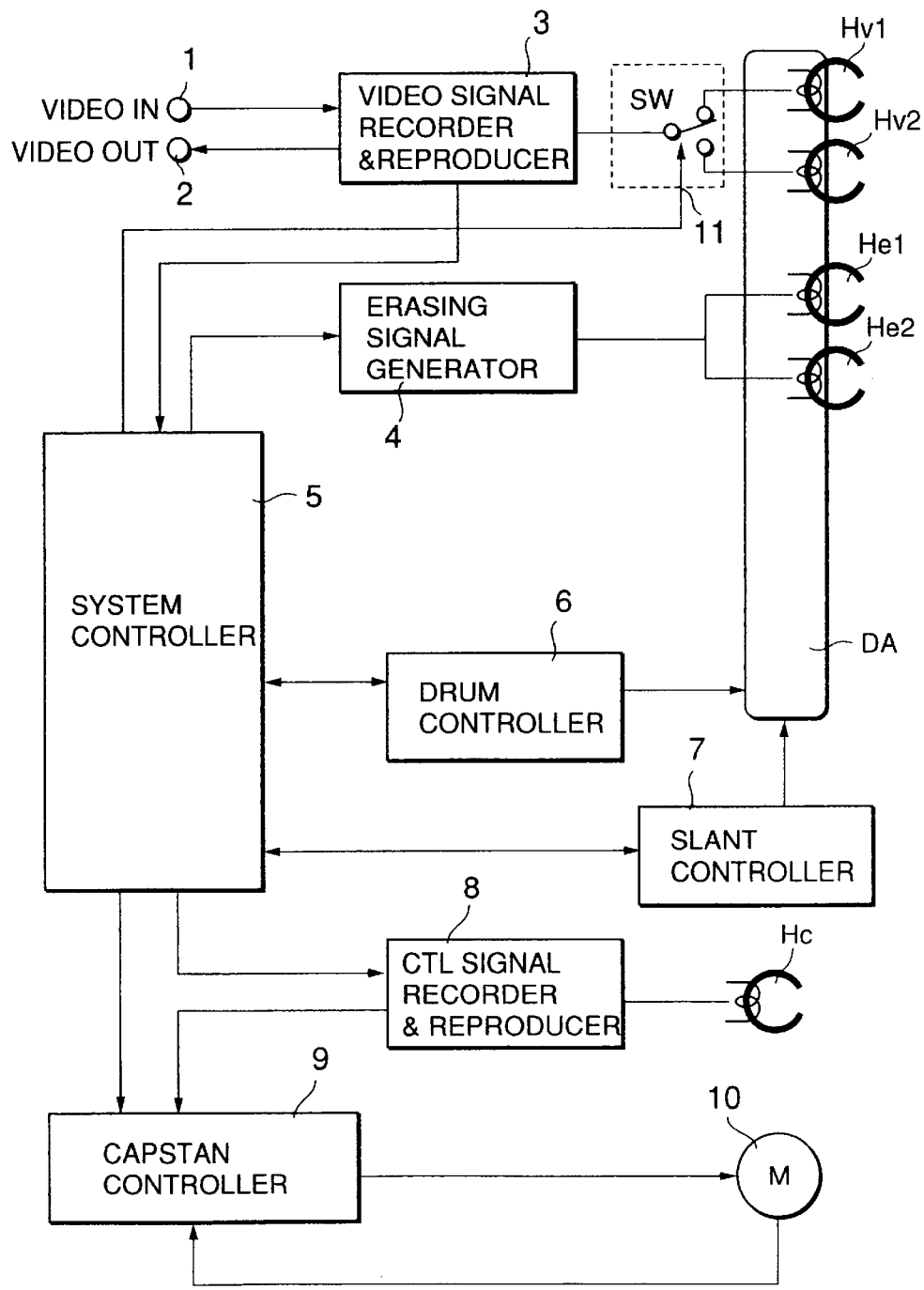
FIG. 1 is a block diagram of an embodiment of a magnetic recording and reproducing apparatus according to the present invention.

FIG. 1 is a block diagram of a preferred embodiment of a magnetic recording and reproducing apparatus according to the present invention.

The magnetic recording and reproducing apparatus includes a video signal recorder and reproducer 3 to which and from which analog video signals are input and output via terminals 1 and 2. Output signals of the video signal recorder and reproducer 3 are supplied to rotary magnetic video heads Hv1 and Hv2 via a switch SW.

A vertical synchronizing signal separated from a composite video signal by the video signal recorder and reproducer 3 is supplied to a system (main) controller 5.

The system controller 5 supplies various control signals to the switch SW, an erasing signal generator 4, a drum controller 6, a slant controller 7, a control (CTL) signal recorder and reproducer 8, and a capstan controller 9.

The erasing signal generator 4 supplies an erasing signal to rotary magnetic erasing heads He1 and He2. The CTL signal recorder and reproducer 8 supplies a control signal to a control head Hc. The capstan controller 9 supplies a control signal to a capstan motor (M) 10.

The video heads Hv1 and Hv2, and the erasing heads He1 and He2 are mounted on a drum assembly DA, which will be explained in detail with reference to FIGS. 2 to 6.

Shown in these figures are the rotary magnetic video heads Hv1 and Hv2, and other rotary magnetic video heads Hv11, Hv21, Hv12 and Hv22 for video signal recording and reproduction, and the first and second rotary erasing heads He1 and He2.

The first rotary magnetic video heads Hv1, Hv11 and Hv12 have a magnetic gap with an azimuth angle of 90 degrees or less in a clockwise direction to a track width.

On the other hand, the second rotary magnetic video heads Hv2, Hv21 and Hv22 have a magnetic gap with an azimuth angle of 90 degrees or less in an anti-clockwise direction to the track width.

As shown in FIGS. 2 to 6, the first and second video heads, and also the first and second erasing heads are arranged symmetrically at 180 degrees on an upper drum Du around a center shaft 12 thereof.

Figure 7:
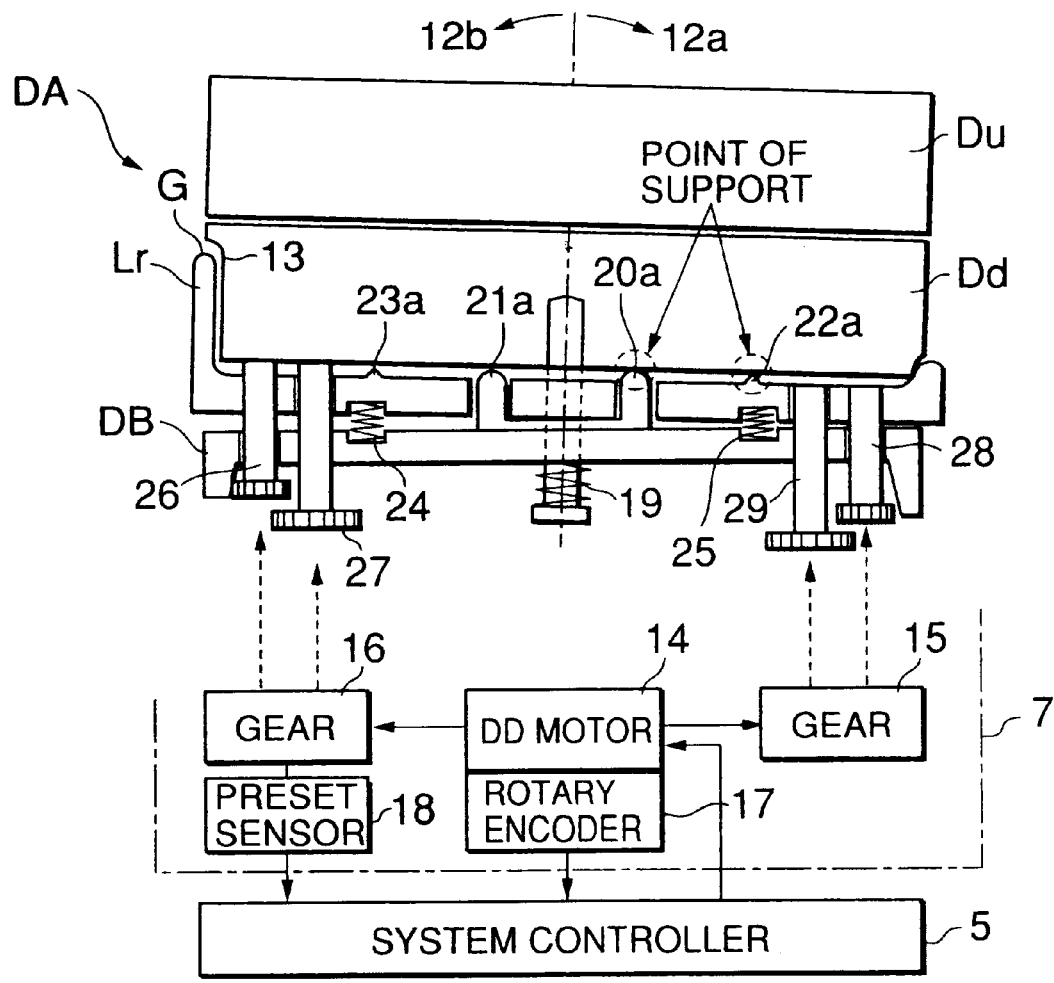
FIG. 7 illustrates a slant control mechanism.

As shown in FIG. 7, the upper drum Du, a lower drum Dd, and a lead ring (guide) Lr constitute the drum assembly DA. The lead ring Lr is provided as close to the outer periphery of a small diameter portion 13 formed at a lower section of the lower drum Dd. The lead ring Lr is to restrict a position of a reference edge Te of a magnetic tape T while travelling. The lead ring Lr is provided with a guide surface Q that is a position restricting surface for the reference edge Te of the magnetic tape T.

Through FIGS. 2 to 6, an arrow "a" indicates a rotational direction of the upper drum Du, and arrows "b" and "–b" indicate a forward and a reverse travel direction, respectively, of the magnetic tape T. A drum motor for driving the upper drum Du is omitted over FIGS. 2 to 6 for brevity. The drum motor may be constructed such that a rotor is fixed at the upper drum motor Du that is rotatably supported by a bearing at a center shaft of the drum assembly DA.

Figure 2:
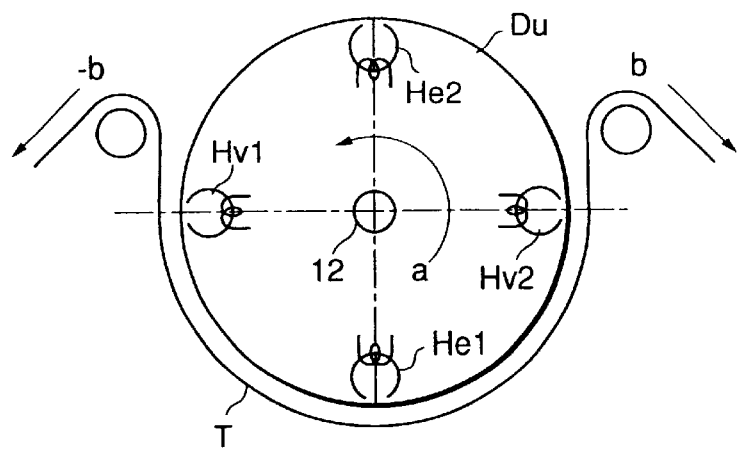
FIG. 2 illustrates an arrangement of rotary magnetic heads.

In a normal recording and reproducing mode, the helical scanning type magnetic recording and reproducing apparatus transfers the magnetic tape T in the forward direction "b" at a standard travel speed V so that tracks are sequentially and alternatively recorded on the magnetic tape T by guard bandless recording with a pair of rotary magnetic heads, such as the first and second video heads Hv1 and Hv2 that are rotating in the direction "a" at a predetermined constant rotary speed as shown in FIG. 2.

Figure 8:
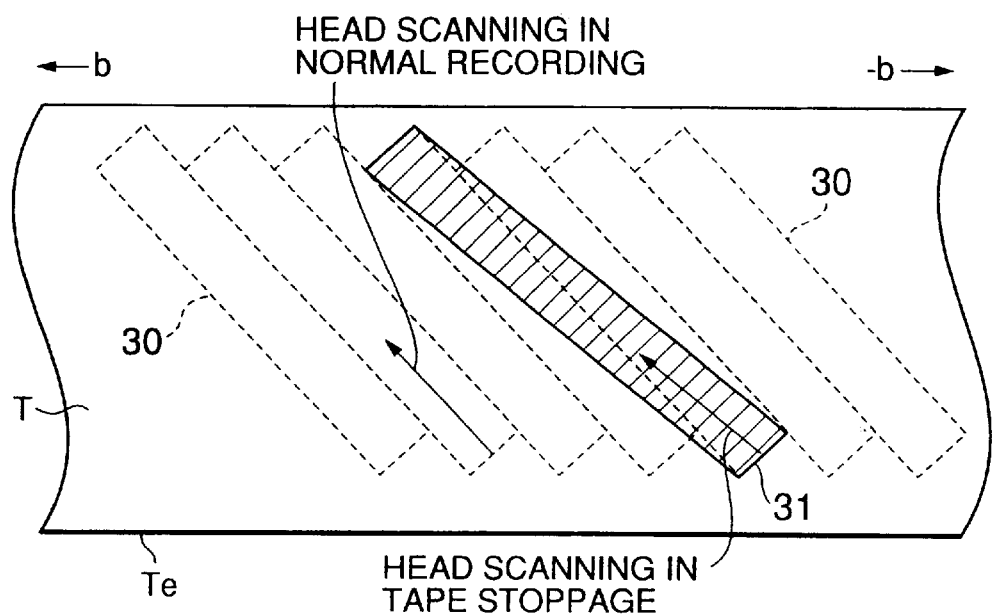
FIG. 8 illustrates a track pattern on a magnetic tape.
Figure 9:
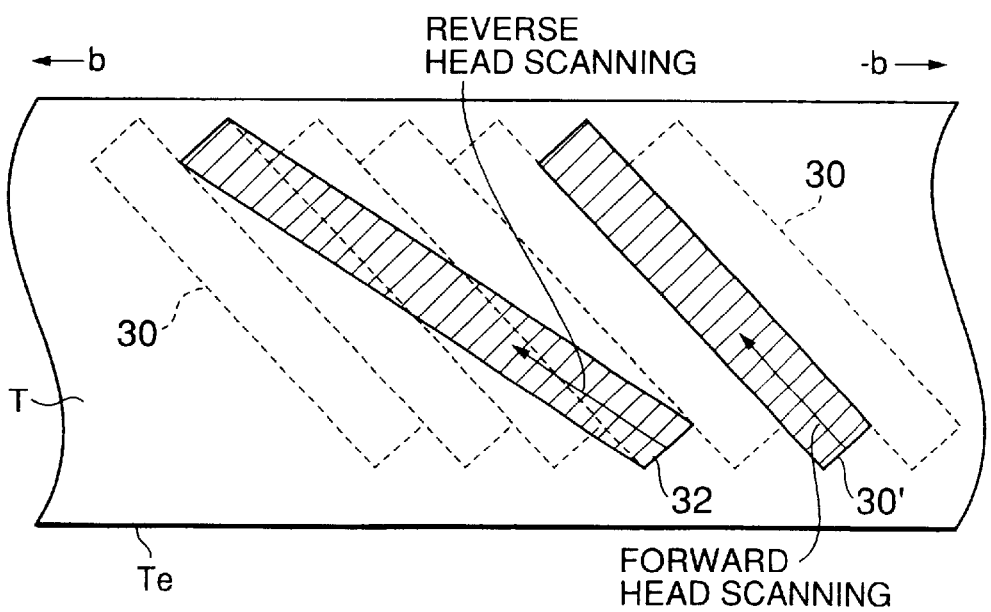
FIG. 9 illustrates a track pattern on a magnetic tape.
Figure 10:
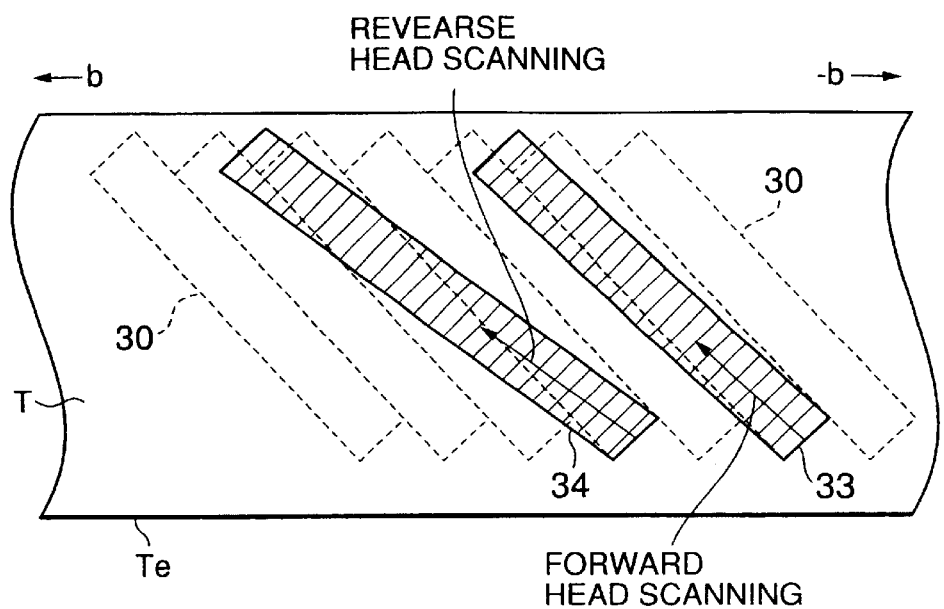
FIG. 10 illustrates a track pattern on a magnetic tape.

The tracks recorded on the magnetic tape T are shown in FIGS. 8, 9 and 10 where dotted line-rectangular tracks 30 are recorded such that they are arranged tightly close to each other at a predetermined angle (track angle) to the reference edge Te of the magnetic tape T. Here, the track angle is an angle between a rotary locus of a rotary magnetic head rotating at a specific speed in a specific direction and the reference edge Te of the magnetic tape T.

On the other hand, the recording with the video head Hv1 or Hv2 rotating in the direction "a" at a predetermined constant rotary speed while the magnetic tape T is stopped forms continuous line-rectangular tracks 31 with oblique lines at a track angle different from that of the tracks 30 as shown in FIG. 8.

Further, the recording with the video head Hv1 or Hv2 while the magnetic tape T is travelling in the forward travel direction "b" at the standard travel speed V forms continuous line-rectangular tracks 32 with oblique lines at a track angle different from that of the tracks 30 as shown in FIG. 9.

Further, the recording with the video head Hv1 or Hv2 on the magnetic tape T is travelling in the forward travel direction "b" at a speed 1/n (n being a natural number) times the standard travel speed V forms continuous line-rectangular tracks 33 with oblique lines at a track angle different from that of the tracks 30 as shown in FIG. 10.

Further, the recording with the video head Hv1 or Hv2 while the magnetic tape T is travelling in the reverse travel direction "−b" at a speed 1/n times the standard travel speed V forms continuous line-rectangular tracks 34 with oblique lines at a track angle different from that of the tracks 30 as shown in FIG. 10.

The tracks 30 to 34 with different track angles can also be recorded with the other video heads shown in FIGS. 3 to 6 besides the video heads Hv1 and Hv2 of FIG. 2.

The magnetic recording and reproducing apparatus according to the present invention conducts a continuous reciprocating recording operation with sequential switching of a travel direction of the magnetic tape T between the forward and reverse directions while it is constantly travelling at a speed V/n slower than the standard travel speed V or is intermittently travelling at an average speed that is equal to the speed V/n.

More in detail, the continuous reciprocating recording operation is carried out with one of the pair of video heads such as the first video head Hv1 to repeat a forward direction recording operation to record sequential tracks on the magnetic tape T with unrecorded areas between the tracks with the same width as that of the tracks.

Further, the continuous reciprocating recording operation is carried out with the other of the pair of video heads such as the second video head Hv2 to repeat a reverse direction recording operation to record sequential tracks on the unrecorded areas as explained above.

The forward and reverse direction recording operations are sequentially and alternatively switched to conduct a time-lapsee recording.

In this invention, track angles become equal to each other without respect to a travel direction of the magnetic tape T when sequential tracks are recorded with the first or the second video head Hv1 or HV2 while the magnetic tape T is stopped during the intermittent traveling at an average speed that is equal to a speed 1/n times the standard speed V. On the other hand, track angles become different from each other in the forward and reverse directions by the time-lapsee recording.

When the value of "n" of the travel speed V/n is large, difference in track angle will be small, even if the travel direction is switched between the forward and reverse directions. This is because the maximum value of "n" is identical to the status where the magnetic tape T is stopped.

Adjacent tracks will largely cross each other if the difference in track angle is large between the forward and reverse directions. This results in a reproduced image of low resolution.

Adjustment is thus required so as to have sequential parallel tracks on the magnetic tape T with the same track angle even if there is change in travel direction or speed of the magnetic tape T.

This track angle adjustment is achieved by the system controller 5 and slant controller 7, which will be described in detail with reference to FIG. 7.

As shown in FIG. 7, the drum assembly DA that consists of the upper drum Du, lower drum Dd and lead ring Lr is supported by the drum base DB. The upper drum Du is rotatably supported around the center shaft 12 of the drum assembly DA with a bearing (not shown) attached to the center shaft 12. On the other hand, the lower drum Dd is fixed to the center shaft 12.

The lead ring Lr as the guide to restrict a position of the reference edge Te of the magnetic tape T while travelling is provided as separated from the lower drum Dd. The lead ring Lr is rather provided as coaxial with a lower protrusion of the lower drum Dd with a knife edge (not shown) formed at the inner surface of the lead ring Lr.

The slant controller 7 includes, as shown in FIG. 7, a slant drive motor (DD motor) 14 with a motor drive controller (not shown), deceleration mechanisms 15 and 16 with gears, a rotary encoder 17, and a positional detector (preset sensor) 18.

The positional detector (preset sensor) 18 may have a light emitting and a receiving device with a circular shading blade that is slidable between the two devices. The positional detector 18 in this arrangement outputs a signal just when the circular shading blade leaves a light travel passage from the light emitting device to the light receiving device. The output signal may indicate a reference position of the center shaft 12 or the lead ring Lr.

A rotational amount of the circular shading blade from its reference position can be detected by counting the number of pulses output from the rotary encoder 17. This provides a direction or an amount of deviation of the drum assembly DA from the center shaft 12 or the lead ring Lr from its reference position.

The system controller 5 supplies control data to the slant controller 7 in accordance with an operating mode of a predetermined travel direction and speed of the magnetic tape T. The slant controller 7 then moves screws 26 and 28 up and down so that the center shaft 12 slants in a direction indicated by an arrow 12a or 12b.

The lead ring Lr also slants by an amount in a specific direction under the control of the slant controller 7. This provides an adequate slant adjustment where tracks recorded on the magnetic tape T have a predetermined track angle without respect to a tape travel direction and also provide a match between a travel locus of the reference edge Te of the magnetic tape Ta and the guide surface G of the lead ring Lr.

The lower drum Dd is supported by four points of supports 20a, 20b, 21a and 21b, and the lead ring Lr is supported by four points of supports 22a, 22b, 23a and 23b when the dotted line tracks 30 shown in FIG. 8 is recorded on the magnetic tape T while travelling in the forward direction "b" (FIG. 2) at a predetermined travelling speed by the rotary magnetic heads rotating in the direction "a" at a predetermined rotary speed as shown in FIG. 2.

Concerning the points of support 20a, 20b, 21a and 21b, FIG. 7 shows only the two points of support 20a and 21a provided as their bottom surface protrude toward the drum base DB. The other two points of supports 20b and 21b are not shown but provided at the same positions of the points of supports 20a and 21a and on an imaginary line vertical to the drawing surface.

Further, concerning the points of support 22a, 22b, 23a and 23b, FIG. 7 also shows only the two points of support 22a and 23a provided as their bottom surface protrude toward the drum base DB. The other two points of support 22b and 23b are not shown but provided at the same positions of the points of support 22a and 23a and on an imaginary line vertical to the drawing surface.

A spring 19 is provided between the lower drum Dd and the drum base DB, and further springs 24 and 25 are provided between the lead ring Lr and the drum base DB to couple them to each other.

The screws 27 and 29 are driven by the slant controller 7 so that the screw 27 pushes up the bottom surface of the lower drum Dd, whereas the screw 29 leaves the bottom surface, to make the two points of support 20a and 20b touch the bottom surface of the lower drum Dd. The center shaft 12 thus rotates in the direction 12a with the points of support 20a and 20b as rotary points of support.

This action happens while the magnetic tape T is travelling at a speed of recording (or reproduction) corresponding to first forward reproduction as a trick play in the same direction as that for the normal recording or reproduction as indicated by the arrow "b" in which the dotted line tracks 30 tightly close to each other are recorded as shown in FIGS. 8, 9 and 10.

On the other hand, the screws 27 and 29 are driven by the slant controller 7 so that the screw 29 pushes up the bottom surface of the lower drum Dd, whereas the screw 27 leaves the bottom surface to make the two points of support 21a and 21b touch the bottom surface of the lower drum Dd. The center shaft 12 thus rotates in the direction 12b with the points of support 21a and 21b as rotary points of support.

This action happens while the magnetic tape T is travelling at a speed of recording (or reproduction) corresponding to the first reproduction as a trick play in the same direction as that for the normal recording or reproduction as indicated by the arrow "−b" in which the dotted line tracks 30 tightly close to each other are recorded as shown in FIG. 9.

While the magnetic tape T is travelling at a speed of first forward reproduction in the forward direction "b", the two points of support 22a and 22b touch the bottom surface of the lower drum Dd so that a center shaft screwed into the leading ring Lr rotates by a specific amount in the direction indicated by the arrow 12b in FIG. 7 with the rotary points of support 22a and 22b, and the screws 26 and 28 rotate in the opposite directions.

On the other hand, while the magnetic tape T is travelling at a speed of first reverse reproduction in the reverse direction "−b", the two points of support 23a and 23b touch the bottom surface of the lower drum Dd so that the center shaft screwed into the leading ring Lr rotates by a specific amount in the direction indicated by the arrow 12a in FIG. 7 with the rotary points of support 22a and 22b, and the screws 26 and 28 rotate in the opposite directions.

These actions to the screws 26 and 28 are also controlled by the slant controller 7 to make the lead ring Lr slant by a specific amount in the direction 12a or 12b in FIG. 7 in accordance with control data for each operation mode supplied from the system controller 5.

Described next is the case for continuous reciprocating recording and reproduction by switching the travel direction of the magnetic tape T between the forward and reverse directions at a travel speed that is 1/n (n being a natural number) times the standard speed V.

The screws 27 and 29 are driven by the slant controller 7 so that the screw 29 pushes up the bottom surface of the lower drum Dd without respect to the tape travel direction, whereas the screw 27 leaves the bottom surface to make the two points of support 21a and 21b touch the bottom surface of the lower drum Dd. The center shaft 12 thus rotates in the direction 12b with the points of support 21a and 21b as rotary points of support.

This action happens while the magnetic tape T is travelling at the speed 1/n times the standard speed V in the normal recording or reproduction mode in the direction as indicated by the arrow "b" or "−b" in which the dotted line tracks 30 tightly close to each other are recorded as shown in FIG. 10.

While the magnetic tape T is travelling at the speed 1/n times the standard speed V in the forward or reverse direction, the two points of support 23a and 23b touch the bottom surface of the lower drum Dd so that the center shaft screwed into the leading ring Lr rotates by a specific amount in the direction indicated by the arrow 12a in FIG. 7 with the rotary points of support 23a and 23b, and the screws 26 and 28 rotate in the opposite directions.

These actions to the screws 26 and 28 are also controlled by the slant controller 7 to make the lead ring Lr slant by a specific amount in the direction 12a in FIG. 7 in accordance with control data for each operation mode supplied from the system controller 5.

In the reciprocating recording, with the switching of the tape travel direction, the slant controller 7 and its mechanism shown in FIG. 7 work to achieve a desired track angle between the loci of the rotary magnetic heads rotating in a specific direction at a specific speed, and the reference edge Te of the magnetic tape T.

The magnetic recording and reproducing apparatus shown in FIG. 1 will be described in detail.

In response to operation mode data entered by a terminal equipment (not shown), the system controller 5 supplies various control signals to the other circuitry.

In recording of analog composite video signal, an analog composite video signal is supplied to the video signal recorder and reproducer 3 via the input terminal 1. The analog composite video signal is converted into a frequency modulated video signal (suitable for magnetic recording) and supplied to the video heads Hv1 and Hv2 via the switch SW.

The vertical synchronizing signal separated from the composite video signal by the video signal recorder and reproducer 3 is supplied to the system controller 5.

The system controller 5 supplies a switching control signal to the switch SW at its terminal 11. The switching control signal is generated on the basis of a drum flip-flop signal generated in synchronism with the rotation of the upper drum Du.

The system controller 5 further supplies a control signal to the erasing signal generator 4. In response to this signal, the erasing signal generator 4 generates an erasing signal which is supplied to the two rotary erasing heads He1 and He2.

Still further, the system controller 5 supplies a control signal to the CTL signal recorder and reproducer 8. In response to this signal, the CTL signal recorder and reproducer 8 generates another control signal which is supplied to the control head Hc. The control signal is then recorded on a control track of the magnetic tape T by the control head Hc.

The recording of control signal by the control head Hc on the control track can be conducted with entire width erasing operation by an entire erasing head to portions of the magnetic tape T preceding to portions to be recorded only when the magnetic tape T initially travels in the forward direction in the continuous reciprocating recording.

There is a case where the recording of control signal is conducted in recording by the video head Hv1 or Hv2 while the magnetic head T is travelling in the forward or reverse direction at a speed 1/n times the standard speed V in the normal recording or reproduction. The control signal recording in this case is conducted on portions of the magnetic head T which have a predetermined positional relationship with the tracks recorded by one of the video heeds while the magnetic head T is initially travelling in the forward direction in the continuous reciprocating recording. The space between adjacent two control signals recorded on the control tracks is the same as that between adjacent two video signals recorded on the signal tracks in the normal recording.

Figure 13:
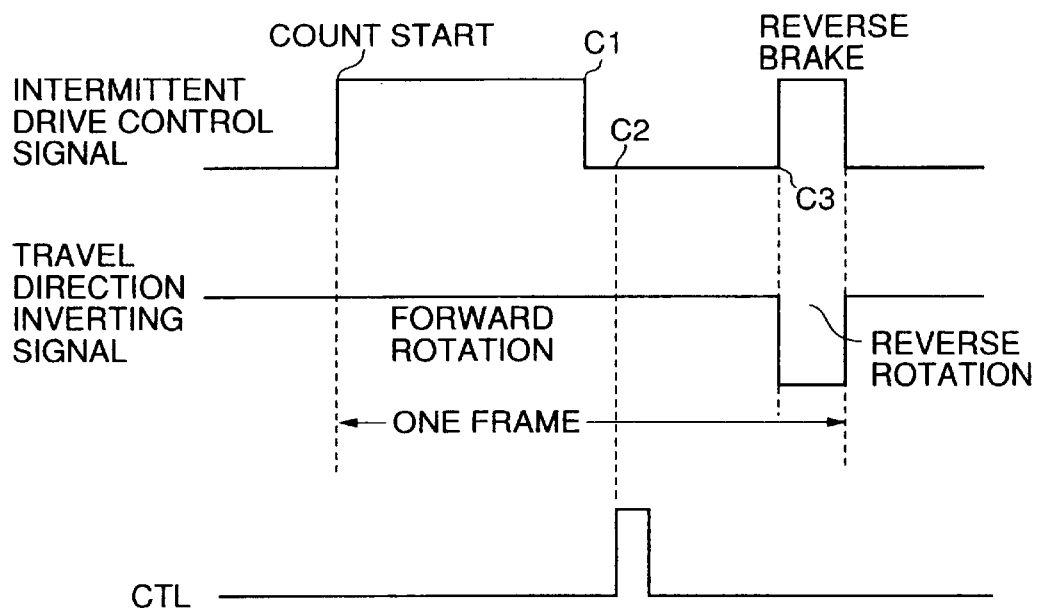
FIG. 13 is a timing chart for explaining intermittent reciprocating recording.

Further, there is a case where the recording of control signal is conducted in recording by the video head Hv1 or Hv2 while the magnetic head T is stopped in intermittent travelling. The control signal recording in this case is conducted such that the control signal is generated by the CTL signal recorder and reproducer 8 while the magnetic head T is travelling and is recorded on the control track as shown in FIG. 13 which will be described later.

The drum controller 6 shown in FIG. 1 is to control a rotary speed and phase of a drum motor (not shown), which will be described in detail with respect to FIG. 11.

Figure 11:
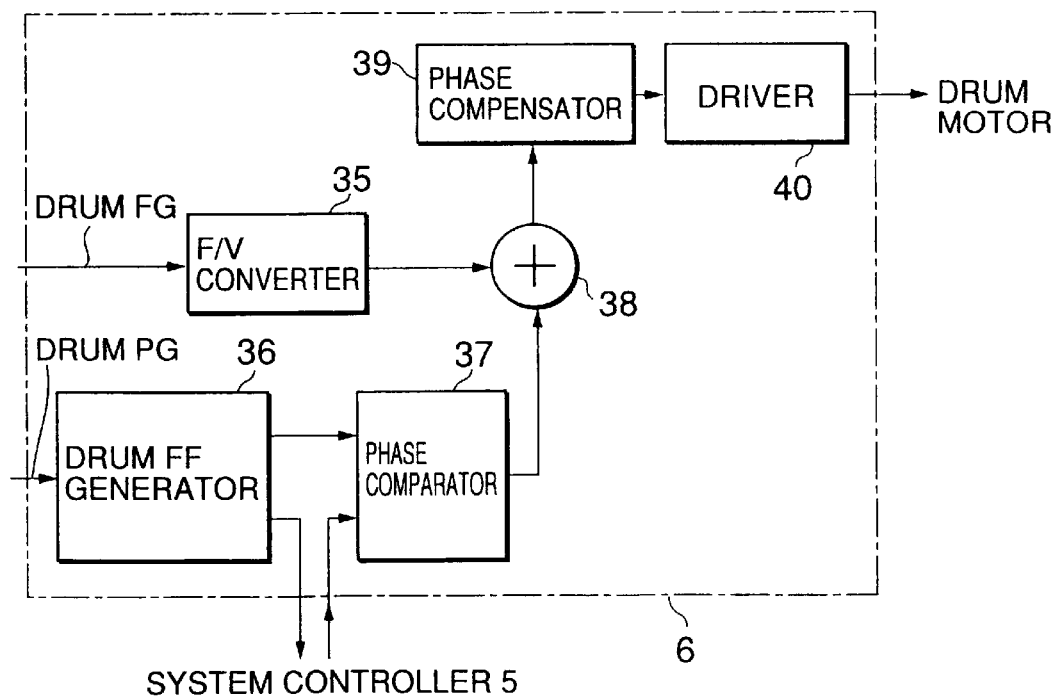
FIG. 11 is a block diagram of a drum controller.

In FIG. 11, a drum FG signal supplied to a frequency-voltage (F/V) convertor 35 is a drum rotary FG signal generated by a frequency generator of a signal generator (both not shown) attached to a rotary shaft of the drum motor. A drum PG signal (rotary reference phase signal) generated by a rotary reference phase signal generator (not shown) of the signal generator is supplied to a drum FF generator 36.

A drum PF signal generated by the drum FF generator 36 is supplied to the system controller 5 and a phase comparator 37. Also supplied to the phase comparator 37 is a reference signal from the system controller 5. Output signals of the F/V convertor 35 and phase comparator 37 are added to each other by an adder 38 and then supplied to a phase compensator 39. An output signal of the phase compensator 39 is supplied to the drum motor via a driver 40.

The capstan controller 9 shown in FIG. 1 is to control a rotary speed and phase of the capstan motor 10, which will be described in detail with respect to FIG. 12.

Figure 12:
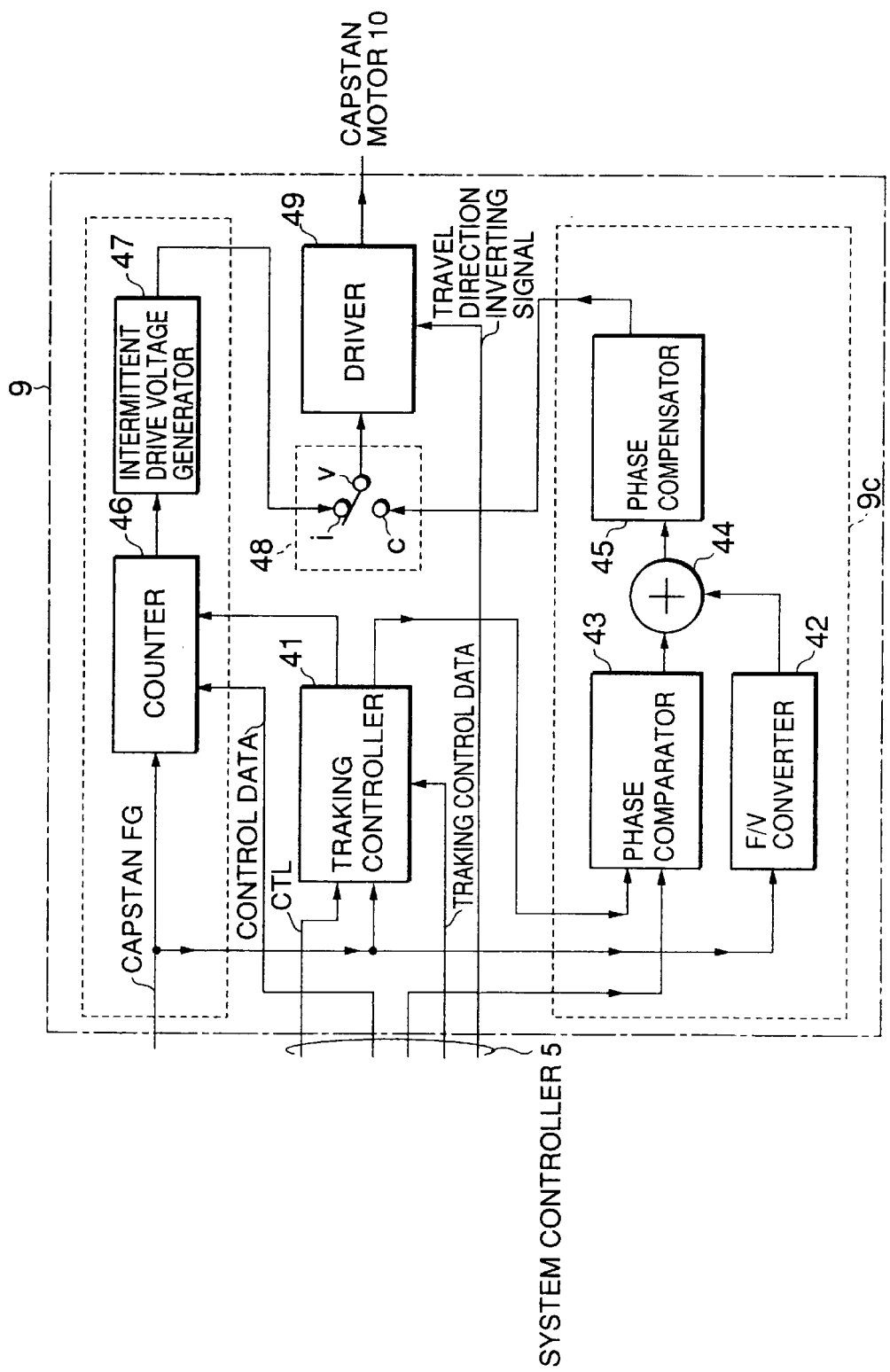
FIG. 12 is a block diagram of a capstan controller.

In FIG. 12, a counter 46 and an intermittent drive voltage generator 47 in a dotted line frame 9i are for generation of a control signal for recording or reproduction while the magnetic tape T is intermittently travelling.

On the other hand, in FIG. 12, a F/V convertor 42, a phase compensator 43, an adder 44 and a phase compensator 45 in a dotted line frame go are for generation of a control signal in recording or reproduction while the magnetic tape T is continuously travelling.

An output signal of the intermittent drive voltage generator 47 is supplied to a switch 48 at its fixed contact "i". An output signal of the phase compensator 45 is also supplied to the switch 48 at its another fixed contact "c". A movable contact "v" of the switch 48 is connected to a driver 49.

In the case of recording or reproduction while the magnetic tape T is intermittently travelling, the movable contact "v" of the switch 48 is switched to the fixed contact "i" in response to the switching control signal from the system controller 5.

On the other hand, in the case of recording or reproduction while the magnetic tape T is continuously travelling, the movable contact "v" of the switch 48 is switched to the fixed contact "c" in response to the switching control signal from the system controller 5.

In FIG. 12, a tracking controller 41, the switch 48 and the driver 49 located outside the dotted line frames 9i and 9c are shared in recording or reproduction while the magnetic tape T is intermittently travelling and it is continuously travelling.

The driver 49, on the basis of a travel direction inverting signal supplied from the system controller 5, inverts a polarity of a drive voltage supplied to the capstan motor 10 to switch a travel direction of the magnetic tape T between the forward and reverse directions.

One of the signals supplied to the capstan controller 9 is a capstan FG signal generated by a frequency generator of a signal generator (both not shown) attached to a rotary shaft of the capstan motor 10. The capstan FG signal is supplied to the counter 46 and F/V converter 42. Also supplied to the counter 46 are control data from the system controller 5 and an output signal of the tracking controller 41.

The tracking controller 41 divides the capstan FG signal and generates a tracking control signal on the basis of the divided capstan FG signal, the control signal CTL reproduced from the control track of the magnetic tape T and the tracking data supplied from the system controller 5. The tracking control signal is then supplied to the phase comparator 43 and the counter 46.

The system controller 5 is provided with a counter and a ROM (both not shown). The ROM stores plural kinds of tracking data. The counter counts the number of recording processes for each travel direction switching, In response to the counting, the plural kinds of tracking data are selectively supplied to the tracking controller 41.

The intermittent drive voltage generator 47 is controlled by the system controller 5 to generates a drive voltage when an operating mode of still picture recording is set via terminal equipment such as keyboard and a mouse. The still picture recording is conducted while the magnetic tape T is intermittently travelling. The drive voltage is then supplied to the driver 49 via the switch 48 at its fixed and movable contacts "i" and "v" and further supplied to the capstan motor 10 as a driving power.

The initial forward direction recording is conducted during the first recording period after the is reciprocating recording starts. A travel direction inverting signal supplied to the driver 49 from the system controller 5 during the first recording period is HIGH as shown in FIG. 13. The driver 49 thus outputs the driving power of a polarity to rotate the capstan motor 10 in the forward direction.

The counter 46 counts the number of capstan FG signals generated on the basis of rotation of the capstan motor 10 and outputs a matching signal whenever count values, and the control data from the system controller 5 and a plurality of predetermined numerical values C1, C2 and C3 as shown in FIG. 13 yield a match. The matching signal is supplied to the intermittent drive voltage generator 47.

The intermittent drive voltage generator 47 generates a high level drive signal as shown in FIG. 13 during the period from a moment at which the counter 46 starts to count the number of capstan FG signals to another moment at which a count value reaches the numerical value C1. The high level drive signal is supplied to the driver 49 via the switch 48 at its fixed and movable contacts "i" and "v". The driver 49 thus outputs, during that period, the driving power of a polarity to rotate the capstan motor 10 in the forward direction. Supplying the driving power to the capstan motor 10 is stopped when a count value reaches the numerical value C1. The capstan motor, however, continues to rotate due to inertia even after the driving power supply is stopped. And, the counter 46 also counts the counting operation.

The forward direction recording as the initial recording of the reciprocating recording records the intermittent drive signal and the travel direction signal generated by the CTL signal recorder and reproducer 8 on the control tacks of the magnetic tape T when a count value of the counter 46 and the numerical value C2 yield a match.

Reverse brakes are applied to the capstan motor 10 to stop when a count value of the counter 46 reaches the numerical value C3 as shown in FIG. 13.

The sign "ONE FRAME" in FIG. 13 corresponds to a travel amount of the magnetic tape T where two adjacent tracks are recorded without crossing each other. The numerical values on the counter 46 are set so that the travel amount of the magnetic tape T precisely corresponds to the "ONE FRAME". The numerical values are carried by the control data from the system controller 5 and the output signal of the tracking controller 41.

In other recording besides the forward direction recording as the initial recording of the reciprocating recording, reverse brakes are applied to the capstan motor 10 to stop when a count value of the counter 46 reaches a numerical value C4. The value C4 corresponds to the tracking data supplied from the system controller 5 and becomes different in a recording period during which the magnetic tape T travels in the forward direction and another recording period during which the magnetic tape T travels in the reverse direction.

Next, in FIG. 12, the phase compensator 45 outputs a signal that is supplied to the driver 49 via the switch 48 at its fixed contact "c" and the movable contact "v" when an operating mode of still picture recording while the magnetic tape is continuously travelling is set via terminal equipment such as keyboard and a mouse.

The capstan FG signal generated by the frequency generator of the signal generator attached to the rotary shaft of the capstan motor 10 is converted into a voltage by the F/V converter 42 (velocity control).

In the initial forward direction recording as the first recording of the reciprocating recording, the capstan FG signal is divided by the tracking controller 41 and supplied to the phase comparator 43. The phase comparator 43 compares the divided capstan FG signal and the reference signal from the system controller 5. The output signals of the phase comparator 43 and F/V converter 42 are added to each other by the adder 44, The output signal of the adder 44 is supplied to the driver 49 via the switch 48 at its fixed contact "c" and movable contact "v".

In other recording besides the first recording, the phase comparator 43 compares a signal obtained by delaying the control signal reproduced from the magnetic tape T in accordance with the tracking data from the system controller 5, and the reference signal also from the system controller 5.

The output signals of the phase comparator 43 and the F/V converter 42 are added to each other by the adder 44. The output signal of the adder 44 is supplied to the driver 49 via the switch 48 at its fixed contact "c" and the movable contact "v".

In the sequential recording, the driver 49 inverts the polarity of a drive voltage supplied to the capstan motor 10 on the basis of the travel direction inverting signal from the system controller 5 to supply a drive power to the capstan motor 10 to switch the travel direction of the magnetic tape T.

In this invention, as shown in FIGS. 2 to 6, the rotary magnetic heads Hv1, Hv2, Hv11, Hv12, Hv21 and Hv22, and rotary erasing heads He1 and he2 mounted on the upper drum Du are rotated in a predetermined direction at a predetermined speed without respect to tape travel direction.

Further the present invention provides the following three operation modes for recording and reproduction:
(1) Normal or trick play mode
(2) The first reciprocating recording that sequentially and alternatively conducts forward and reverse direction recording.

The forward direction recording is to repeatedly record one track corresponding to one picture video signal on a position of the magnetic tape T that is stopped after intermittent predetermined distance travel in the forward direction, next to another already recorded track corresponding to one picture video signal with an unrecorded area therebetween by one of the two video head pair such as Hv1 and Hv2, Hv11 and Hv12, and Hv21 and Hv22.

The reverse direction recording is to repeatedly record one track corresponding to one picture video signal on the unrecorded area (formed in the forward direction recording) of the magnetic tape T that is stopped after intermittent predetermined distance travel in the reverse direction by the other (not used in the forward direction recording) of the two video head pair.

(3) The second reciprocating recording mode that sequentially and alternatively conducts forward and reverse direction recording.

The forward direction recording is to repeatedly record one track corresponding to one picture video signal on a position of the magnetic tape T that is continuously travelling at a speed 1/n times the standard speed V in the forward direction, next to another already recorded track corresponding to one picture video signal with an unrecorded area therebetween by one of the video head pair such as Hv1 and Hv2, Hv11 and Hv12, and Hv21 and Hv22.

The reverse direction recording is to repeatedly record one track corresponding to one picture video signal on the unrecorded area (formed in the forward direction recording) of the magnetic tape T that is continuously travelling at the speed 1/n times the standard speed V in the reverse direction by the other (not used in the forward direction recording) of the video head pair.

The magnetic recording and reproducing apparatus according to the invention can be operated in any of the operating mode (1), (2) and (3) by entering operating mode data via terminal equipment such as a keyboard and a mouse.

The operation of the magnetic recording and reproducing apparatus according to the invention in the operating mode (1) is well known and hence omitted here.

The operation of the magnetic recording and reproducing apparatus according to the invention in the operating mode (2) will be described.

In the operating mode (2), a track angle formed by one of the video head pair such as Hv1 in the forward direction recording and another track angle formed by the other of the video head pair such as Hv2 in the reverse direction recording become equal to each other. The reciprocating recording thus requires no change in position of rotary loci of the video heads in both the forward and reverse direction recording by the slant controller 7.

It rather requires change in position of rotary loci of the video heads by the slant controller 7 to obtain a preferable reproduced signal while a magnetic tape to which still picture recording has been done in the operating mode (2) is continuously travelling at a constant speed.

It is also preferable to change positions of rotary loci of the video heads Hv1 and Hv2 by the slant controller 7 in both the forward and reverse direction recording to record tracks with a track angle on a stopped magnetic tape, equal to the track angle of the tracks 30 shown in FIGS. 8, 9 and 10 recorded by the video heads Hv1 and Hv2 while the magnetic tape is travelling at the standard speed V.

Figure 14:
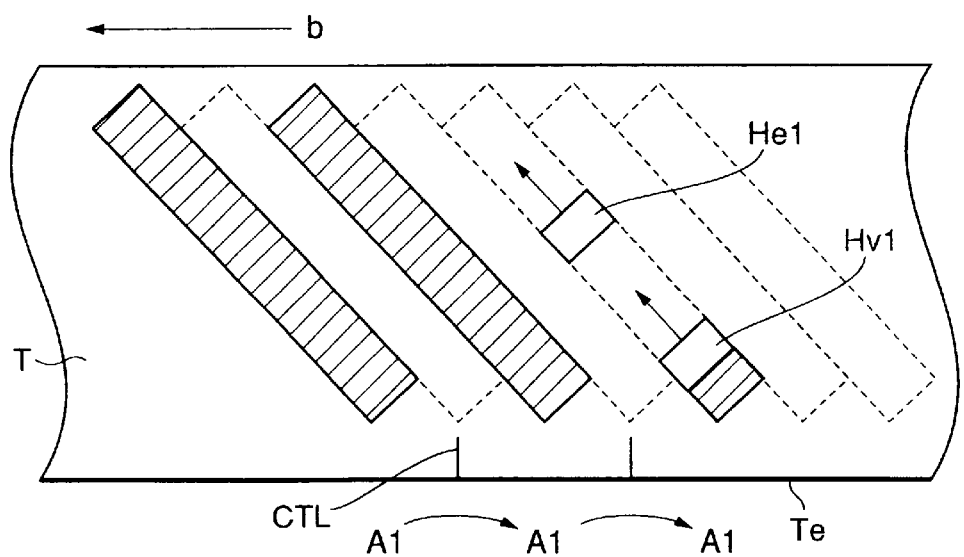
FIG. 14 illustrates a track pattern on a magnetic tape.

FIG. 14 illustrates a recording status in the initial forward direction still picture recording in the operating mode (2) in which sequential tracks A1 each corresponding to one picture video signal are recorded on the magnetic tape T which is stopped after intermittent travelling by two pictures in the forward direction indicated by an arrow "b" by the video head Hv1 of the video head pair Hv1 and Hv2.

Also formed on the magnetic tape T are unrecorded areas each located between two tracks A1 and with the same width as that of each track A1. FIG. 14 also shows the rotary erasing head He1 that conducts an erasing operation before the recording of video head Hv1.

As shown in FIG. 14, in the initial forward direction recording of the reciprocating recording, the control signal CTL is recorded on the control track by the control head Hc while the magnetic tape T is travelling as described with reference to FIG. 13. FIG. 14 depicts the control signal CTL as located close to the tracks recorded by the video head for easier understanding.

Figure 15:
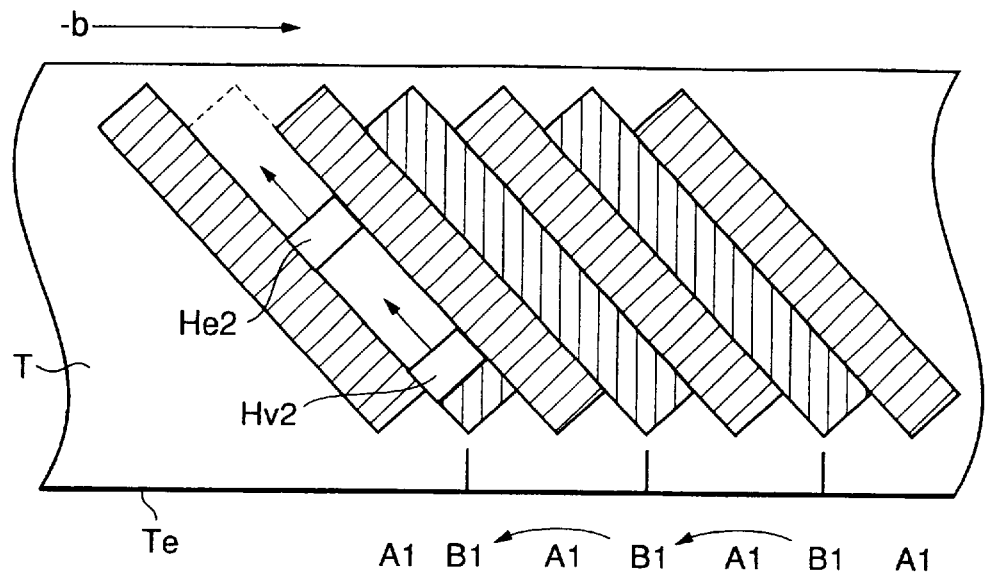
FIG. 15 illustrates a track pattern on a magnetic tape.

On the other hand, FIG. 15 illustrates a recording status in the initial reverse direction still picture recording in the operating mode (2) in which tracks B1 each corresponding to one picture video signal are recorded on the unrecorded areas of FIG. 14 when the magnetic tape T is stopped after travelling by two tracks in the reverse direction indicated by an arrow "−b" by the video head Hv2 of the video head pair Hv1 and Hv2. FIG. 15 also shows the rotary erasing head He2 that conducts an erasing operation before the recording of video head Hv2.

Track recording positions are controlled by the capstan controller 9 using the control signal reproduced from the control track on the magnetic tape T for recording periods in the reciprocating still picture recording besides the initial forward direction recording.

Figure 16:
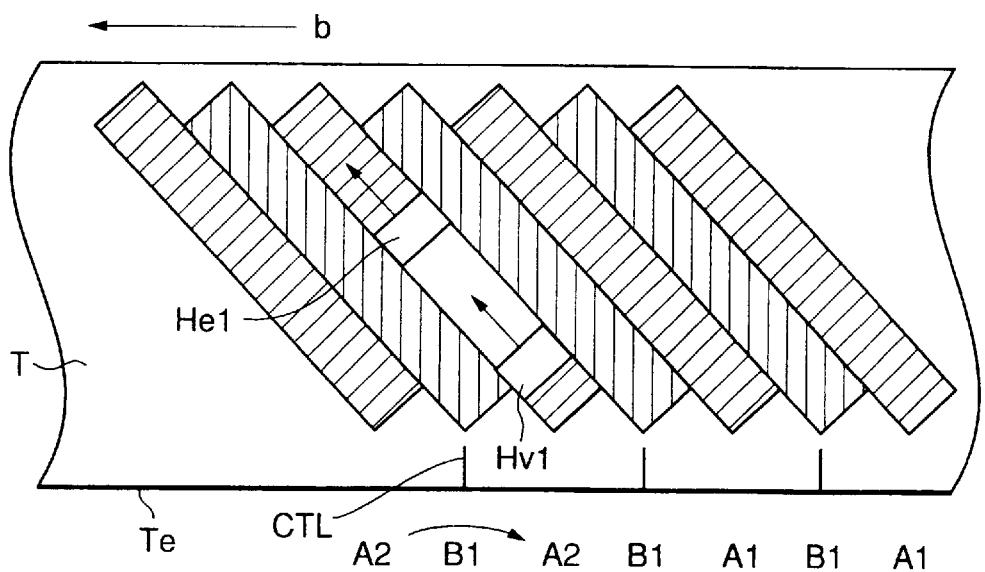
FIG. 16 illustrates a track pattern on a magnetic tape.

FIG. 16 illustrates a recording status in the second forward direction recording with the video head Hv1 after the initial reverse direction recording with the video head Hv2. The video head used for the second forward direction recording is the video head Hv1 which has been used for the initial forward direction recording.

In other words, the video head Hv1 which has been used for the initial forward direction recording is used any time for the forward direction recording. Further, the video head Hv2 which has been used for the initial reverse direction recording is used any time for the reverse direction recording.

As shown in FIG. 16, tracks A2 are recorded in the second reverse direction recording between the tracks B1 recorded in the initial reverse direction recording. Since the tracks A1 have already been recorded between the tracks B1 in the initial forward direction recording, the tracks A1 are erased by the erasing head He1 before the second forward direction recording.

FIGS. 14 to 16 illustrate the states where the tracks are recorded by the video head Hv2 while the magnetic tape T is stopped in the forward and reverse direction recording with the track angle equal to that of the dotted line tracks 30 shown in FIGS. 8, 9 and 10 recorded by the video heads Hv1 and Hv2 while the magnetic tape T is traveling at the standard speed V, where the rotary loci of the video heads are varied by the slant controller 7 in the forward and reverse direction recording.

Figure 17:
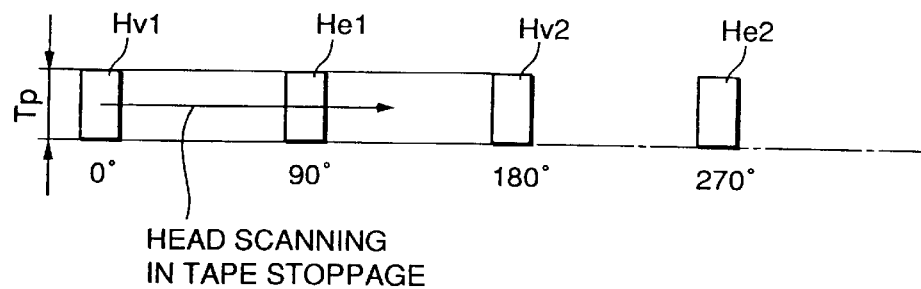
FIG. 17 illustrates an erasing operation before recording operation.

FIG. 17 illustrates the arrangement of the rotary magnetic erasing heads He1 and He2 capable of erasing portions to be recorded with tracks each corresponding to one picture video signal by the video heads Hv1 and Hv2 in the reciprocating recording while the magnetic tape T is stopped after intermittent travel by two tracks width.

It is understood that the erasing heads He1 and He2 are mounted on the upper drum Du such that they are located on the bisector orthogonal to the imaginary line connecting the video heads Hv1 and Hv2 arranged in 180-degree symmetry, and the erasing heads He1 and He2 and the video heads Hv1 and Hv2 are adjusted in the same height on the upper drum Du.

It is also understood from FIG. 17 that only one erasing head is required when the video heads Hv1 and Hv2 are adjusted in the same height on the upper drum Du.

Switching of the travel direction of the magnetic tape T can be conducted by detecting a transparent leader tape portion provided at both ends of the magnetic tape T. Or, the travel direction switching can be done with index signals recorded on specific positions on the magnetic tape T where the travel direction is switched whenever the index signals are reproduced. Manual travel direction switching is also available.

Figure 18:
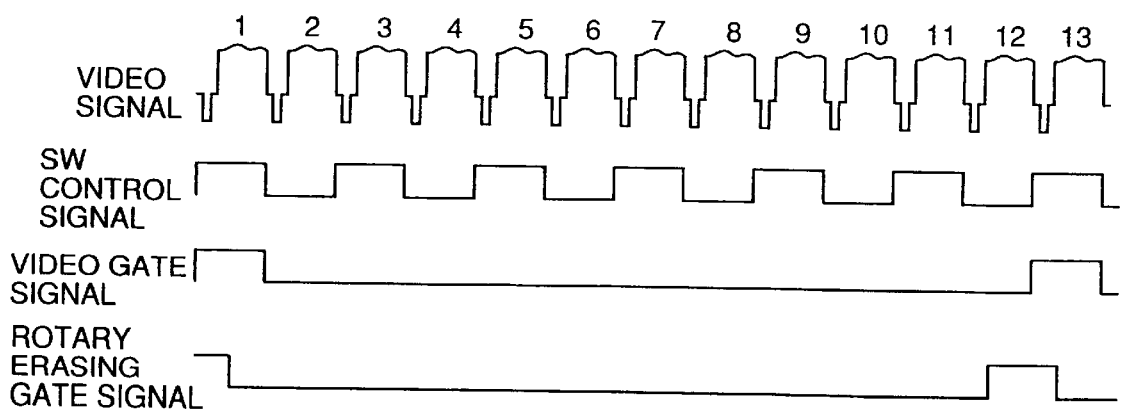
FIG. 18 is a timing chart for explaining reciprocating recording.

FIG. 18 shows a timing chart in the reciprocating recording as described with reference to FIGS. 14 to 16. This timing chart represents that a video signal corresponding to one field-period (one picture) is supplied to the video heads for each 12 field-period (12 pictures) in response to a video gate signal and recorded picture by picture on the magnetic tape T. This recording corresponds to intermittent recording where a practical travel speed of the magnetic tape T is $\frac{1}{6}$ times the standard speed V.

A SW control signal shown in FIG. 18 is used for switching the two video heads Hv1 and Hv2. Further, a phase difference between the video gate signal and a rotary erasing signal is 90 degrees which is the case where the rotary magnetic heads mounted on the upper drum Du used in the reciprocating recording as described with reference to FIGS. 14 to 16 are arranged as shown in FIGS. 2 or 3.

Figure 3:
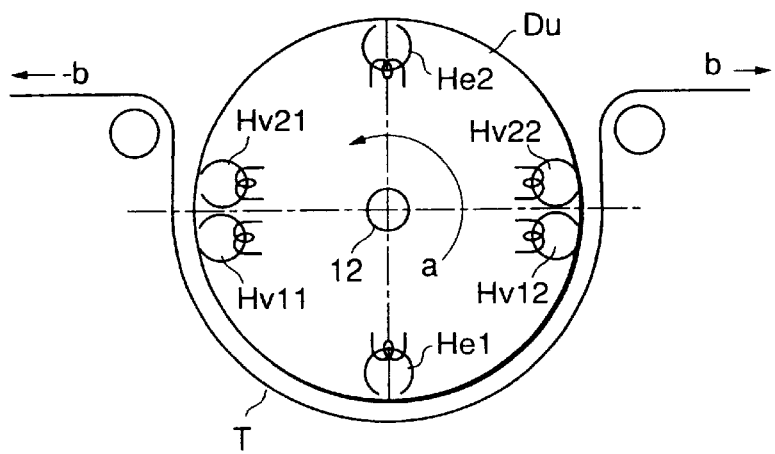
FIG. 3 illustrates an arrangement of rotary magnetic heads.

FIG. 3 illustrates the rotary magnetic head arrangement on the upper drum Du in consideration of reproduction. In detail, the video heads Hv11 and Hv21 are arranged as close to each other with magnetic gaps of different azimuth angles. The video head Hv22 with a magnetic gap of the same azimuth angle as that of the video head Hv21 is located as oppose to the video head Hv11 with 180 degree-symmetry. The video head Hv12 with a magnetic gap of the same azimuth angle as that of the video head Hv11 is located as oppose to the video head Hv21 with 180 degree-symmetry. Further, the rotary erasing heads He1 and He2 are arranged with 180 degree-symmetry between the video heads Hv21 and HV22, and Hv11 and Hv12.

In reproduction with the rotary magnetic heads arranged as shown in FIG. 3 on the upper drum Du, tracks recorded by the video head Hv11 (Hv12) in the forward direction recording are selectively traced by the two video heads Hv11 and Hv12 with slant adjustment; and tracks recorded by the video head Hv21 (Hv22) in the reverse direction recording are selectively traced by the two video heads Hv21 and Hv22 with slant adjustment.

The description made so far is for the case where the present invention is applied to VTRs for recording one track with one field-period analog signal. Not only this, the present invention can be applied to digital VTRs for recording a plurality of tracks with one picture video signal with audio signal by means of combination of memories.

Next, for the operating mode (3), the operation mode data is entered via terminal equipment (not shown) such as a keyboard or mouse. The magnetic recording and reproducing apparatus according to the present invention thus conducts the forward direction recording to repeatedly record one track corresponding to one picture video signal on a position of the magnetic tape T that is continuously travelling at a speed 1/n times the standard speed V in the forward direction, next to another already recorded track corresponding to one picture video signal with unrecorded areas therebetween by, for example, the video head Hv1 of the pair Hv1 and Hv2 shown in FIG. 2.

Next, the magnetic recording and reproducing apparatus conducts the reverse direction recording to repeatedly record one track corresponding to one picture video signal on the unrecorded areas formed in the forward direction recording of the magnetic tape T that is continuously travelling at a speed 1/n times the standard speed V in the reverse direction by the video head Hv2.

In the operating mode (3), a control signal is recorded on the control track of a predetermined location with respect to the tracks recorded by the predetermined one of the video head pair. The control signal is recorded only for the forward direction recording period just after the initiation of the continuous reciprocating recording, not other recording periods.

The recorded control signal is reproduced for the recording periods other than the forward direction recording period just after the initiation of the continuous reciprocating recording. The capstan control for sequential recording periods starts on the basis of the reproduced control signal to precisely record one track between two tracks already recorded for the period just before the present recording period.

If still picture recording is conducted at a speed V/n where "n" is a very large value in the operating mode (3), a difference between a track angle formed by the video head Hv1 in the forward direction recording and another track angle formed by the video head Hv2 in the reverse direction recording is extremely small.

Accordingly, there is no crossing of the tracks recorded in the forward and reverse direction recording without adjustment of rotary loci of the video heads by the slant controller 7. However, the capstan control may not work well if no such adjustment is made when the magnetic tape T travels at a very slow speed almost like stoppage.

On the other hand, if still picture recording is conducted at a speed V/n where "n" is a very small value in the operating mode (3), a difference between a track angle formed by the video head Hv1 in the forward direction recording and another track angle formed by the video head Hv2 in the reverse direction recording is extremely large.

There will be crossing of the tracks recorded in the forward and reverse direction recording. The rotary loci of the video heads is thus adjusted by the slant controller 7 to avoid such crossing.

The rotary loci of the video heads are thus adjusted by the slant controller 7 to form the same track angles in the forward and reverse direction recording to achieve an image of high quality when reproduced.

However, there is a tape speed range where a degraded image is allowable which is caused by crossing of the tracks recorded in the forward and reverse direction recording due to no adjustment by the slant controller 7. Track angle adjustment is of course not needed in such a tape speed range.

Figure 19:
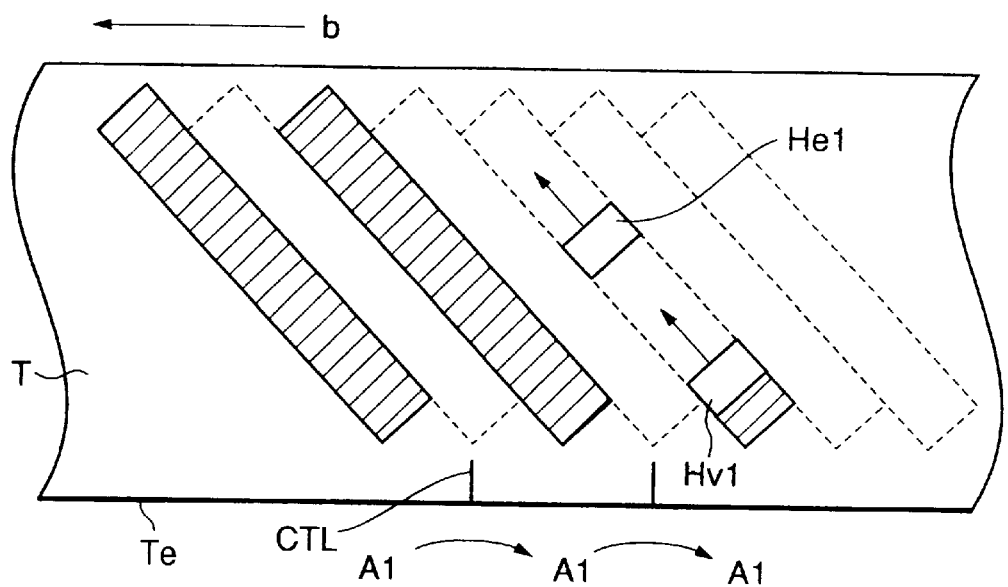
FIG. 19 illustrates a track pattern on a magnetic tape.
Figure 20:
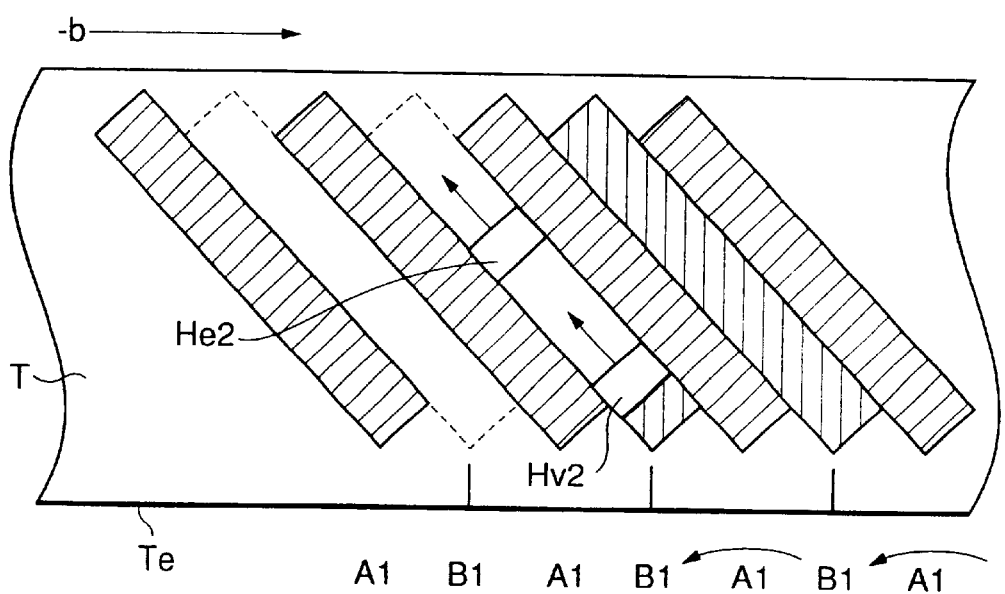
FIG. 20 illustrates a track pattern on a magnetic tape.
Figure 21:
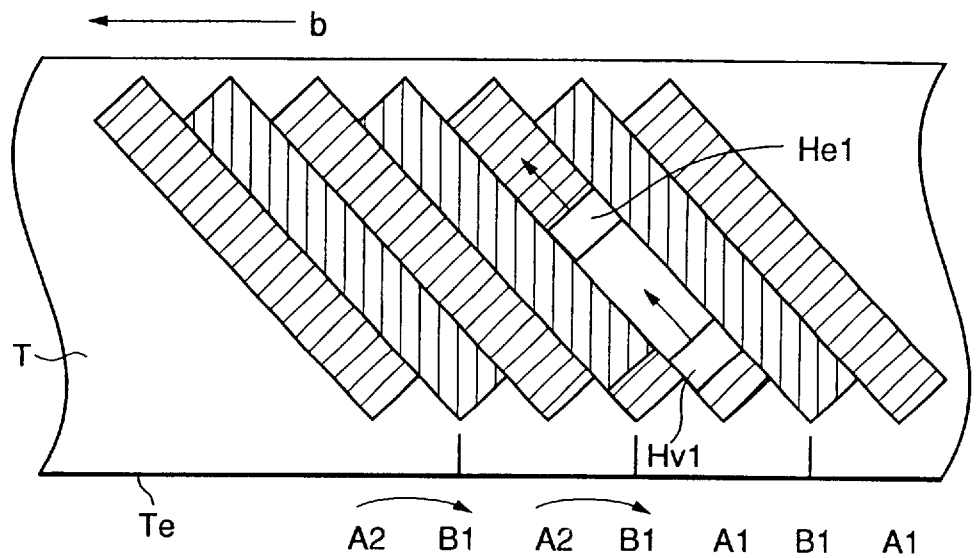
FIG. 21 illustrates a track pattern on a magnetic tape.

FIGS. 19 to 21 illustrate still picture recording in the operating mode (3) with the track angle adjustment by the slant controller 7 using the rotary magnetic heads shown in FIG. 2 to record tracks with the same track angle in the forward and reverse direction recording.

In detail, FIG. 19 illustrates the initial forward direction recording to record tracks A1 each corresponding to one picture for each twice rotation (n=2) of the upper drum Du by the video head Hv1 on the magnetic tape T while continuously travelling at a speed V/2 (n=2) in the forward direction dedicated by an arrow "b". There is an unrecorded area between two tracks A1.

Also shown in FIG. 19 is the rotary erasing head He1. Recorded in the initial forward direction recording of the first reciprocating recording is the control signal (pulse) CTL on the control tracks of the magnetic tape T. FIG. 19 depicts the control signals CTL as close to the tracks A1 for easier understanding.

FIG. 20 illustrates the initial reverse direction recording to record tracks B1 by the video head Hv2 on the unrecorded areas formed in the initial forward direction recording. Also shown in FIG. 20 is the rotary erasing head He2 for erasing before the recording by the video head Hv2.

The location of the tracks recorded by the video head Hv1 or Hv2 is controlled by the capstan controller 9 using the control signal reproduced from the control track of the magnetic tape T for the recording periods other than the period of the initial forward direction recording in the reciprocating still picture recording.

FIG. 21 illustrates the second forward direction recording by the video head Hv1 after the initial reverse direction recording by the video head Hv2 The video head used in the second forward direction recording is the video head Hv1 which was used in the initial forward direction recording.

The forward direction recording always uses a video head with an azimuth angle equal to the azimuth angle of the video head used for the initial forward direction recording. The same is true for the reverse direction recording.

FIG. 21 illustrates the second forward direction recording to record tracks A2 between the tracks B1 which have been recorded in the initial reverse direction recording, with preceding erasing, by the rotary erasing head He1, of the tracks A1 which have been recorded between the tracks B2 in the initial forward direction recording.

The preceding erasing for the (2m+1)-th recording period by the rotary erasing head He1 or He2 is applied only to the tracks recorded for the (2m−1)-th recording period, and the preceding erasing for the (2m+2)-th recording period is applied only to the tracks recorded for the 2m-th recording period in the continuous reciprocating recording, where "m" is a natural number.

Figure 22:
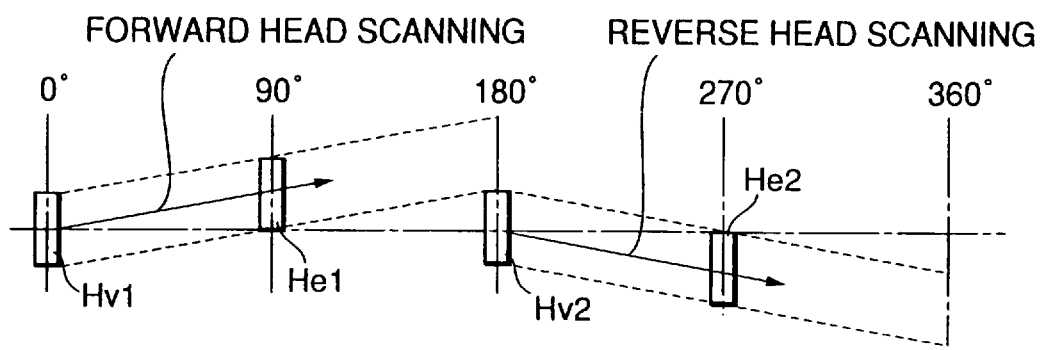
FIG. 22 illustrates an erasing operation before recording operation.

FIG. 22 illustrates the arrangement of the two video heads Hv1 and Hv2, and the two erasing heads He1 and He2 mounted on the upper drum Du used in the reciprocating recording shown in FIGS. 19 to 21. Here, the rotary heads Hv1, Hv2, He1 and He2 have the same head track width.

The angles 0, 90, 180, 270 and 360 degrees shown in FIG. 22 are the center angles of the rotary center of the upper drum Du of FIG. 2. The video head Hv1 is provided on a position of the upper drum, that corresponds to the center angle 0 (=360) degrees, and the video head Hv2 is provided on another position of the upper drum, that corresponds to the center angle 180 degrees at the same height as that of the video head Hv1.

The rotary erasing head He1 is provided on a position of the upper drum Du, that corresponds to the center angle 90 degrees with a head track width whose lower edge has the same height as that of the center of the head track width of the video heads Hv1 and Hv2.

On the other hand, the rotary erasing head He2 is provided on another position of the upper drum Du, that corresponds to the center angle 270 degrees with a head track width whose upper edge has the same height as that of the center of the head track width of the video heads Hv1 and Hv2.

Under the arrangement of the rotary magnetic heads as shown in FIG. 22, the rotary erasing heads He1 and He2 complete the preceding erasing to the portions to be recorded by the video heads Hv1 and Hv2, respectively, in the still picture recording while the magnetic tape T is travelling at a speed ½ (n=2) times the standard speed V.

Figure 23:
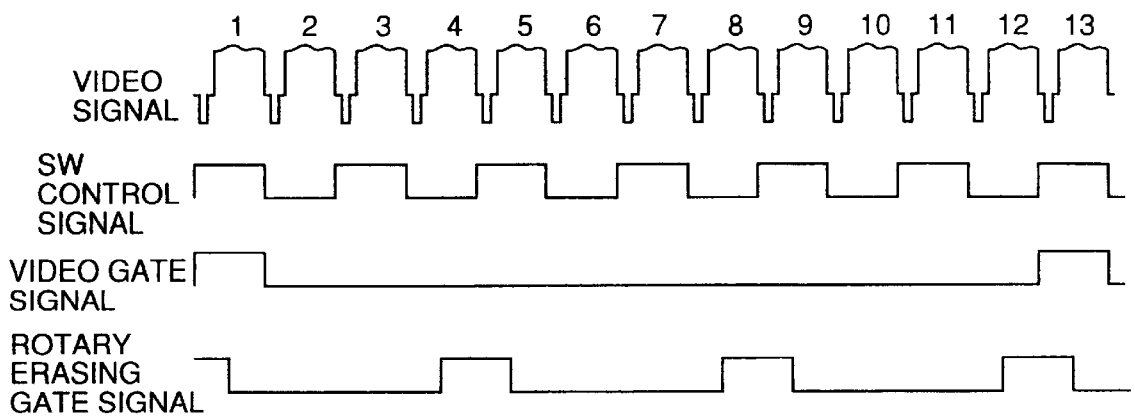
FIG. 23 is a timing chart for explaining reciprocating recording.

FIG. 23 shows a timing chart of the reciprocating recording as described with reference to FIGS. 19 to 21 by the video heads Hv1 and HV2, and the erasing heads He1 and He2 arranged as shown in FIG. 2.

This timing chart represents that a video signal corresponding to one field-period (one picture) is supplied to the video heads for each 4 field-period (4 pictures) in response to a video gate signal and is recorded picture by picture on the magnetic tape T. A SW control signal shown in FIG. 23 is a head switching signal for the video heads Hv1 and Hv2. There is a 90 degree phase difference between the video gate signal and a rotary erasing gate signal.

Figure 5:
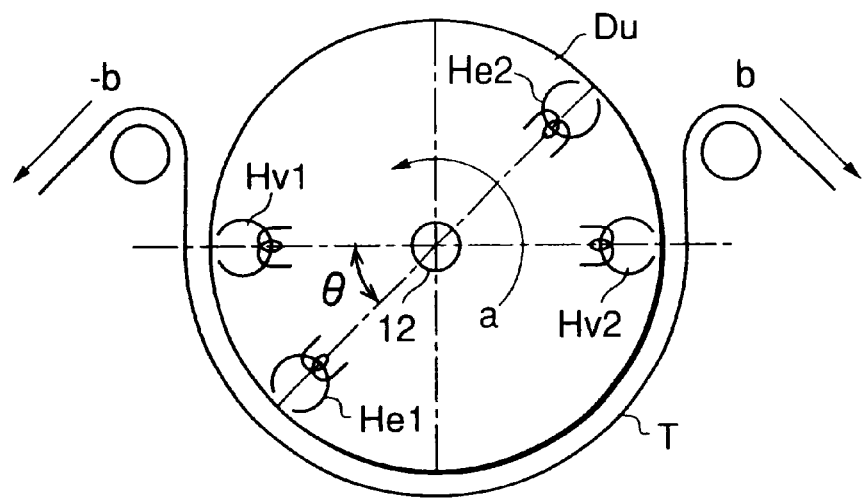
FIG. 5 illustrates an arrangement of rotary magnetic heads.
Figure 6:
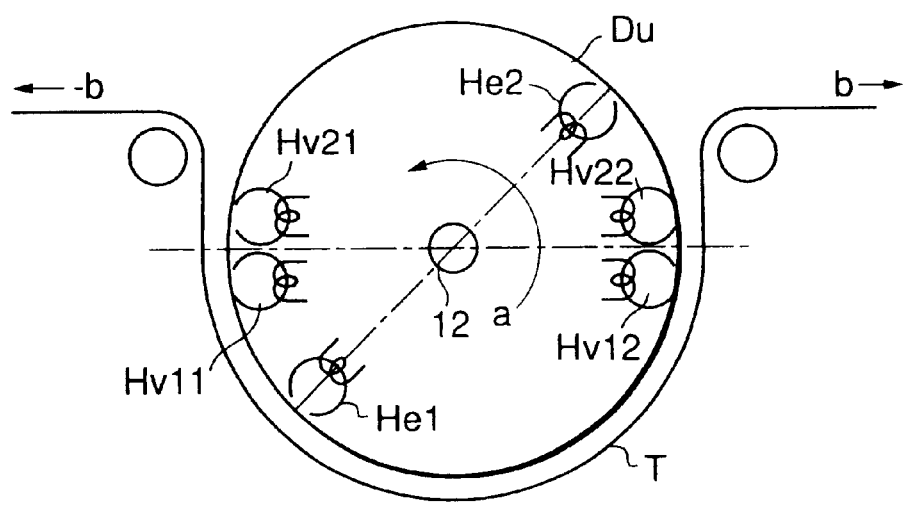
FIG. 6 illustrates an arrangement of rotary magnetic heads.
Figure 24:
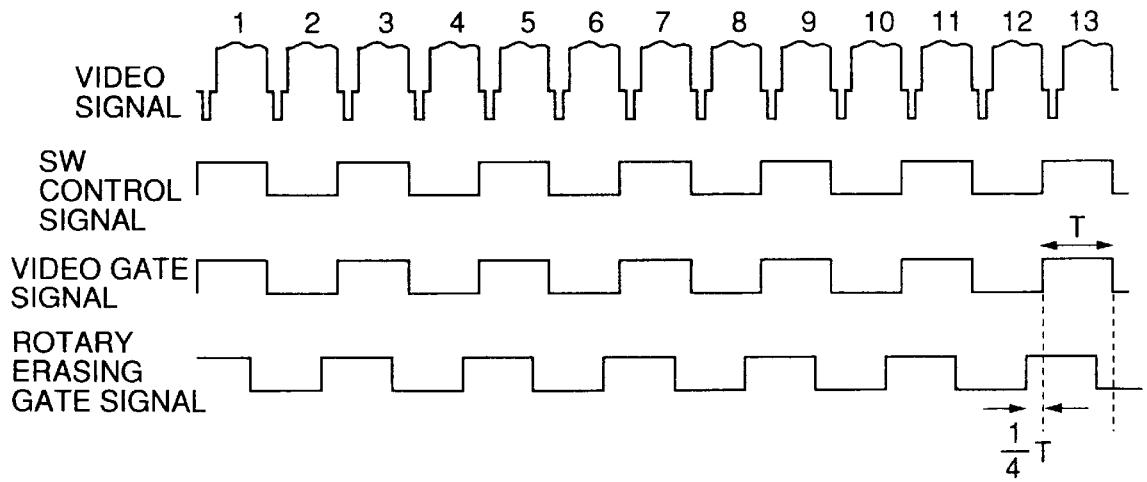
FIG. 24 is a timing chart for explaining reciprocating recording.

On the other hand, FIG. 24 shows a timing chart of the reciprocating recording as described with reference to FIGS. 19 to 21 by the video heads Hv1 and HV2, and the erasing heads He1 and He2 arranged as shown in FIGS. 5 and 6. As shown in FIG. 5, both the video heads Hv1 and HV2, and the erasing heads He1 and He2 are arranged with 180 degree symmetry; both the heads Hv1 and He1, and Hv2 and He2 have a 45 degree angular positional relationship with respect to the center shaft 12.

This timing chart shown in FIG. 24 represents that a video signal corresponding to one field-period (one picture) is supplied to the video heads for each 2 field-period (2 pictures) in response to a video gate signal and recorded picture by picture on the magnetic tape T while travelling at the standard speed V (n=1). A SW control signal shown in FIG. 24 is a head switching signal for the video heads Hv1 and Hv2. There is a 45 degree phase difference between the video gate signal and a rotary erasing gate signal.

Switching of the travel direction of the magnetic tape T in the operation mode (3) can also be conducted by detecting a transparent leader tape portion provided at both ends of the magnetic tape T. Or, the travel direction switching can be done with index signals recorded on specific positions on the magnetic tape T where the travel direction is switched whenever the index signals are reproduced. Manual travel direction switching is also available.

Further, in reproduction in the operating mode (3) with the rotary magnetic heads arranged as shown in FIG. 3 on the upper drum Du, tracks recorded by the video head Hv11 (Hv12) in the forward direction recording are selectively traced by the two video heads Hv11 and Hv12 with slant adjustment, and tracks recorded by the video head HV21 (Hv22) in the reverse direction recording are selectively traced by the two video heads Hv21 and Hv22 with slant adjustment to reproduce videos in accordance with the time recorded on the magnetic tape T.

The description made so far in the operating mode (3) is the case where the present invention is applied to VTRs for recording one track with one field-period analog signal. Not only this, the present invention can be applied to digital VTgs for recording a plurality of tracks with one picture video signal with audio signal by means of combination of memories.

Described next is the arrangement of the video and erasing heads, and preceding erasing by the erasing heads in the case of still picture recording where the magnetic tape T continuously travels at the standard speed V in the operating modes (2) and (3).

Figure 4:
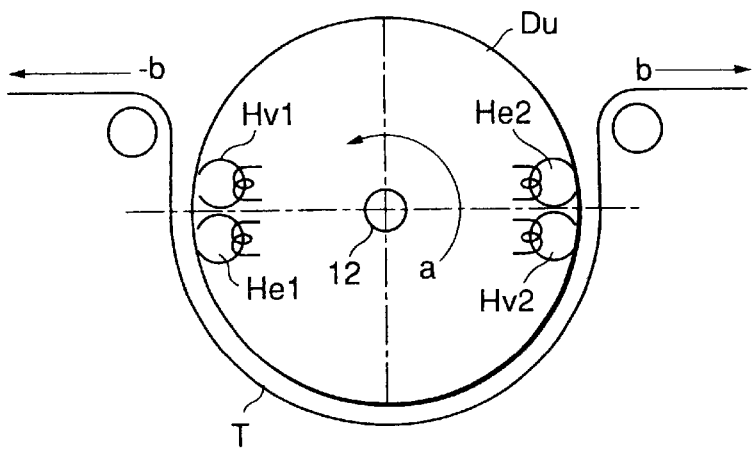
FIG. 4 illustrates an arrangement of rotary magnetic heads.

The arrangement of the video heads Hv1 and Hv2, and the erasing heads He1 and He2 shown in FIG. 4 is that, adjacent to the video head Hv1, the erasing head He1 with the same head track width as that of the video head Hv1 is provided at the same height, and adjacent to the video head Hv2, the erasing head He2 with the same head track width as that of the video head Hv2 is provided at the same height. The video heads Hv1 and Hv2 are provided with 180 degree symmetry. Each head's height is adjusted as described above at its center height.

Figure 25:
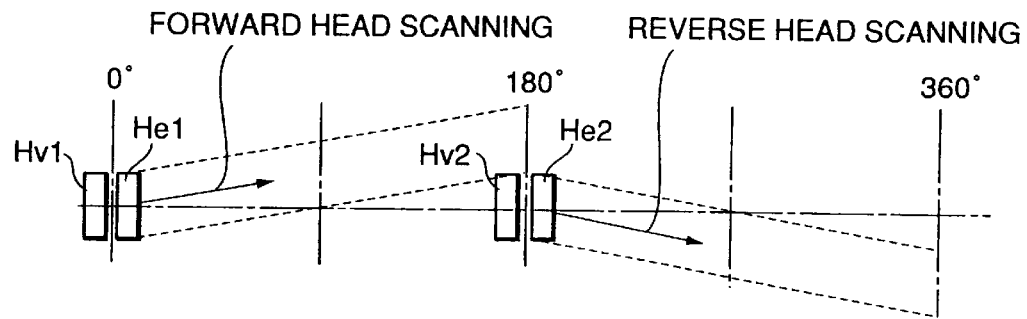
FIG. 25 illustrates an erasing operation before recording operation.

FIG. 25 illustrates the erasing operation by the erasing head He1 before the recording operation by the video head Hv1 while the magnetic tape T is continuously travelling at the standard speed V in the forward direction, and the other erasing operation by the erasing head He2 before the recording operation by the video head Hv2 while the magnetic tape T is continuously travelling at the standard speed V in the reverse direction under the arrangement shown in FIG. 4.

Figure 26:
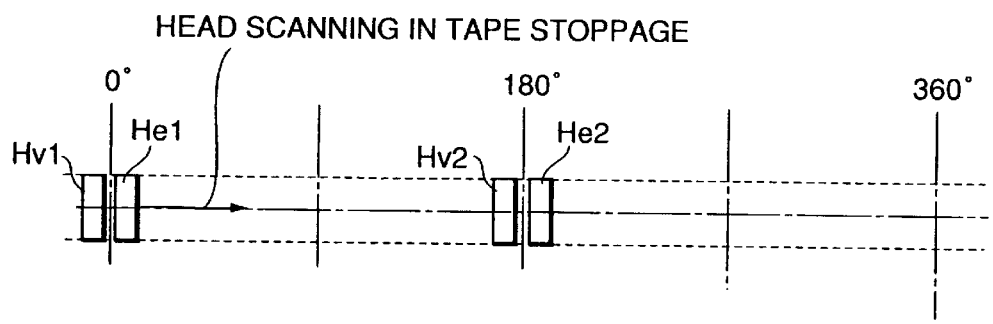
FIG. 26 illustrates an erasing operation before recording operation.

On the other hand, FIG. 26 illustrates the erasing operation by the erasing head He1 before the forward direction recording operation by the video head Hv1 while the magnetic tape T is stopped during the intermittent travelling, and the other erasing operation by the erasing head He2 before the reverse direction recording operation by the video head Hv2 while the magnetic tape T is stopped during the intermittent travelling under the arrangement shown in FIG. 4.

Figure 27:
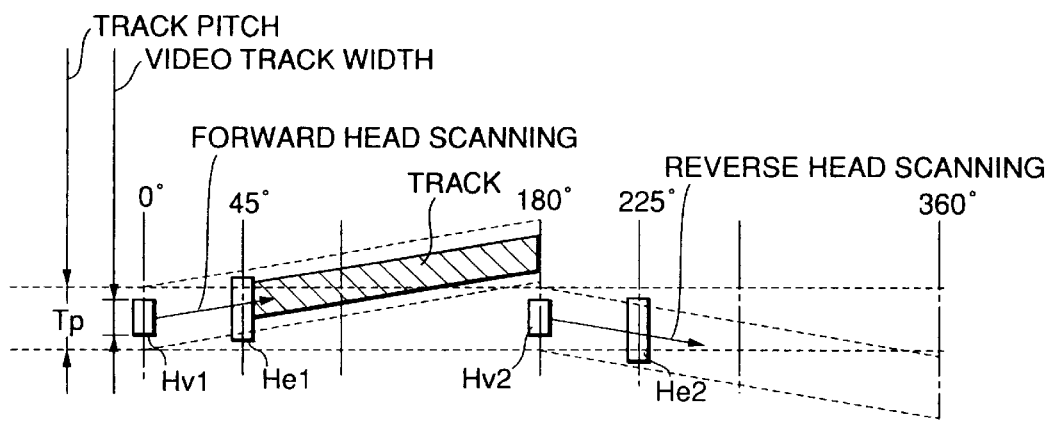
FIG. 27 illustrates an erasing operation before recording operation.

FIG. 27 illustrates the preceding erasing operation by the rotary erasing heads He1 and He2, under the arrangement shown in FIG. 5, with the same head track width as the predetermined track pitch Tp for the standard recording.

More in detail, FIG. 27 illustrates the erasing operation by the rotary erasing head He1 before forward direction recording by the video head Hv1 while the magnetic tape T is continuously travelling at the standard speed V in the forward direction, and the other erasing operation by the rotary erasing head He2 before reverse direction recording by the video head Hv2 while the magnetic tape T is continuously travelling at the standard speed V in the reverse direction.

Figure 28:
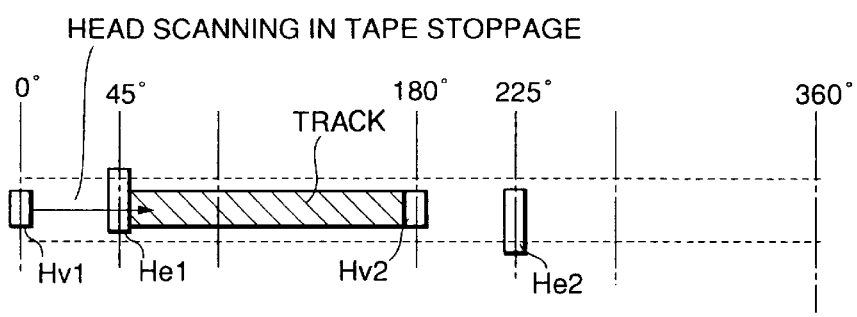
FIG. 28 illustrates an erasing operation before recording operation.

On the other hand, FIG. 28 illustrates the preceding erasing operation by the rotary erasing heads He1 and He2, under the arrangement shown in FIG. 5, with a head track width narrower than the track pitch Tp for the standard recording.

More in detail, FIG. 28 illustrates the erasing operation by the rotary erasing head He1 before the forward direction recording by the video head Hv1 while the magnetic tape T is stopped during the intermittent travelling, and the other erasing operation by the rotary erasing head He2 before the reverse direction recording by the video head Hv2 while the magnetic tape T is stopped during the intermittent travelling.

The height of the video heads Hv1 and Hv2, and the erasing heads He1 and He2 are as shown in FIGS. 27 and 28. The head track width of the video heads may be adjusted as narrower than that shown in FIGS. 27 and 28 to provide the erasing heads at locations preceding the video heads with an angle of 45 degrees or more therebetween, however, this would cause lowering the reproduced signal level.

Figure 29:
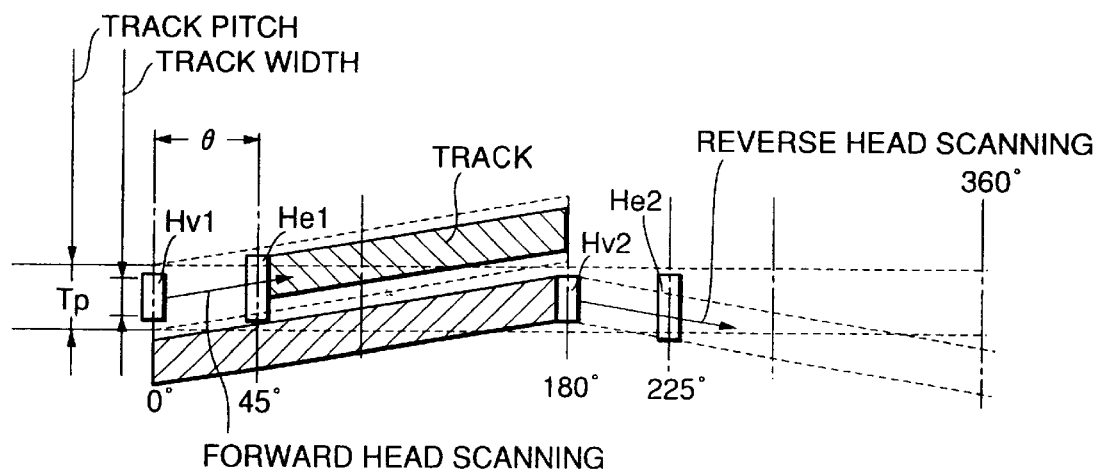
FIG. 29 illustrates an erasing operation before recording operation.
Figure 30:
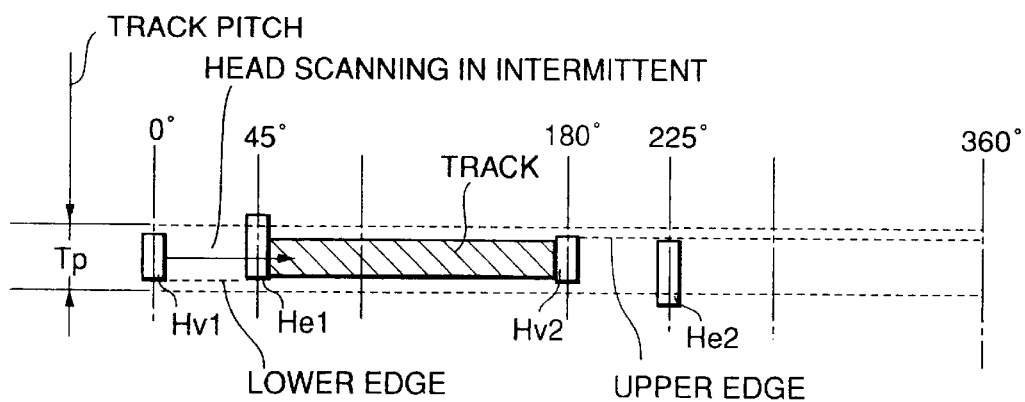
FIG. 30 illustrates an erasing operation before recording operation.

FIGS. 29 and 30 illustrate the preceding erasing operation by the rotary erasing heads He1 and He2, under the arrangement shown in FIG. 5, with the allowable maximum head track width (Tp−Tp·θ/180) where Tp is a track pitch determined for the standard recording, θ is the center angle at the center shaft of the upper drum Du with respect to the locations of the video head Hv1 (Hv2) and erasing head He1 (He2) provided preceding to the vide head Hv1(hv2).

In FIGS. 29 and 30, the head track pitch of both the erasing heads He1 and He2 is equal to the track pitch Tp. Further, in FIGS. 29 and 30, the video head Hv1 and erasing head He1 are arranged at a height such that their lower edges match each other, whereas the video head Hv2 and erasing head He2 are arranged at a height such that their upper edges match each other.

More in detail, FIG. 29 illustrates the preceding erasing operation by the erasing head He1 before the recording by the video head Hv1 while the magnetic tape T is continuously travelling at the standard speed V in the forward direction, and the other preceding erasing operation by the erasing head He2 before the recording by the video head Hv2 while the magnetic tape T is continuously travelling at the standard speed V in the reverse direction.

Further, FIG. 30 illustrates the preceding erasing operation by the erasing head He1 before the forward direction recording by the video head Hv1 while the magnetic tape T is stopped during the intermittent travelling, and the other preceding erasing operation by the erasing head He2 before the reverse direction recording by the video head Hv2 while the magnetic tape T is stopped during the intermittent travelling.

Figure 31:
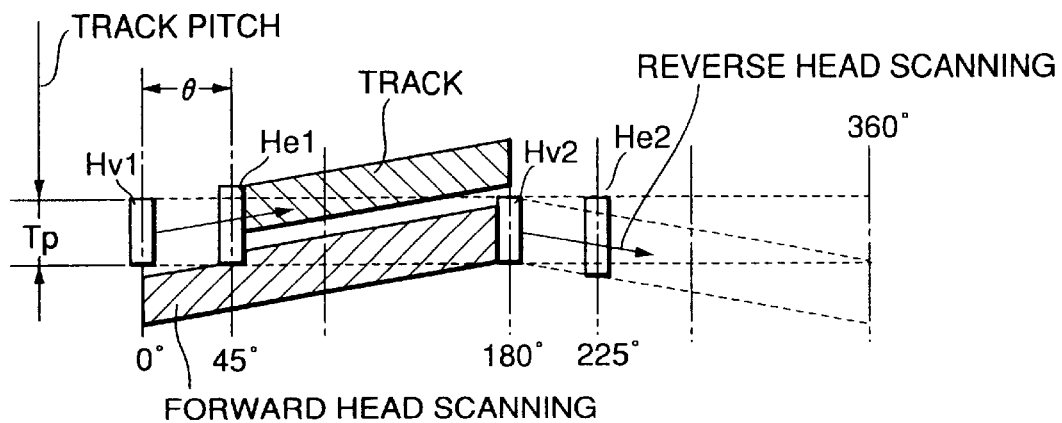
FIG. 31 illustrates an erasing operation before recording operation.
Figure 32:
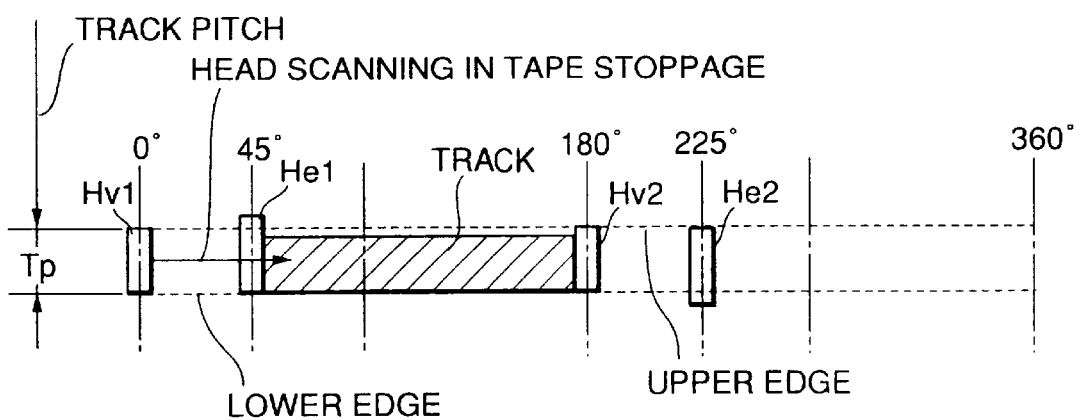
FIG. 32 illustrates an erasing operation before recording operation.

On the other hand, FIGS. 31 and 32 illustrate the preceding erasing operation by the video heads Hv1 and Hv2, and the erasing heads He1 and He2 with head track widths different from those shown in FIGS. 29 and 30.

In detail, the head track width of the video heads Hv1 and Hv2 is equal the track pitch Tp, whereas the head track width of the erasing heads He1 and He2 is wider than the track pitch Tp.

More in detail, FIG. 31 illustrates the preceding erasing operation by the erasing head He1 before the recording by the video head Hv1 while the magnetic tape T is continuously travelling at the standard speed V in the forward direction, and the other preceding erasing operation by the erasing head He2 before the recording by the video head Hv2 while the magnetic tape T is continuously travelling at the standard speed V in the reverse direction.

Further, FIG. 32 illustrates the preceding erasing operation by the erasing head He1 before the forward direction recording by the video head Hv1 while the magnetic tape T is stopped during the intermittent travelling, and the other preceding erasing operation by the erasing head He2 before the reverse direction recording by the video head Hv2 while the magnetic tape T is stopped during the intermittent travelling.

It is understood from FIGS. 31 and 32 that the track recorded by the second recording can be erased well in the speed range of the standard travel speed V to the stoppage. The head track width of the video heads may be adjusted as wider than that shown in FIGS. 31 and 32 to provide the erasing heads at locations preceding the video heads with an angle of 45 degrees or more therebetween, however, this would cause lowering the reproduced signal level.

FIGS. 31 and 32 show angular relationships on the upper drum Du between the video head Hv1 and the erasing head He1, and the video head Hv2 and the erasing head He2. Here, the head track pitch of the video heads Hv1 and Hv2 is the track pitch Tp determined for the standard recording, and head track pitch of the erasing heads He1 and He2 is (Tp+Tp·θ/180) where θ is the center angle at the center shaft of the upper drum Du with respect to the locations of the video head Hv1 (Hv2) and the erasing head He1 (He2) provided preceding to the vide head Hv1(hv2).

In FIGS. 31 and 32, the head track pitch of both the erasing heads He1 and He2 is equal to the track pitch Tp. Further, in FIGS. 31 and 32, the video head Hv1 and erasing head He1 are arranged at a height such that their lower edges match each other, whereas the video head Hv2 and erasing head He2 are arranged at a height such that their upper edges match each other.

Figure 33:
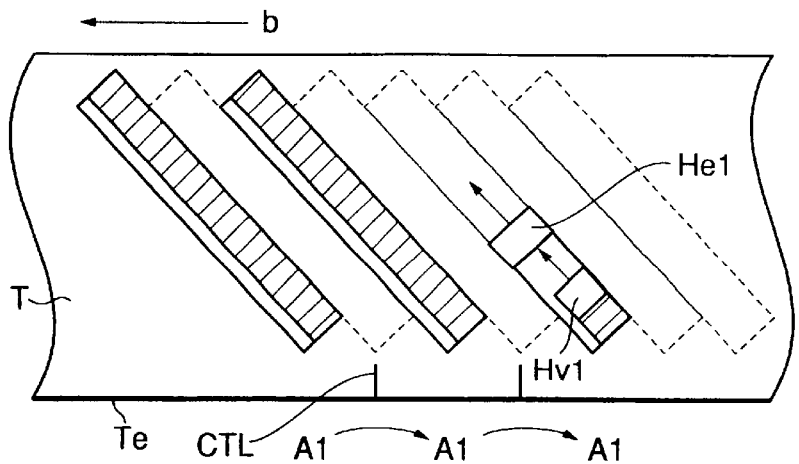
FIG. 33 illustrates a track pattern on a magnetic tape.
Figure 34:
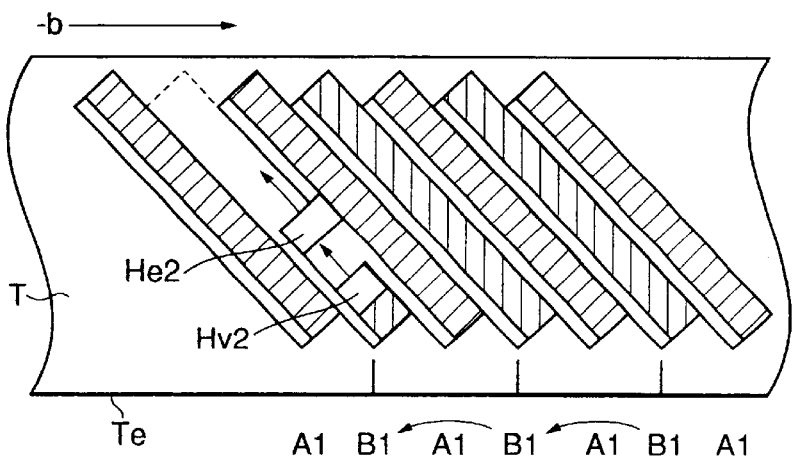
FIG. 34 illustrates a track pattern on a magnetic tape.

FIGS. 33 and 34 illustrate reciprocating recording in the operating mode (3) with the video heads Hv1 and HV2 and the erasing heads He1 and He2 shown in FIG. 31. Further, FIGS. 33 and 34 illustrate still picture recording to record tracks on the magnetic tape T with the same track angle in both the forward and reverse direction recording by varying the rotary loci of the vide heads by the slant controller 7.

In detail, FIG. 33 illustrates the initial forward direction recording in the first forward direction recording to sequentially record tracks A1 each corresponding to a picture signal for each rotation (n=1) of the upper drum Du by the video head Hv1 shown in FIG. 31 while the magnetic tape T is travelling at the standard speed V in the forward direction as indicated by an arrow "b". Unrecorded areas are formed between two tracks A1 during the initial forward direction recording. The erasing operation is conducted by the erasing head He1 before the initial forward direction recording by the video head Hv1.

As shown in FIG. 33, a control signal CTL is recorded by the control head Hc as described before in the initial forward direction recording of the first reciprocating recording. FIG. 33 depicts the control signal CTL as located close to the tracks recorded by the video head for easier understanding.

FIG. 34 illustrates the initial reverse direction recording in the operating mode (3) to sequentially record tracks B1 each corresponding to a picture signal for each rotation (n=1) of the upper drum Du by the video head Hv2 shown in FIG. 31 while the magnetic tape is travelling at the standard speed V in the reverse direction as indicated by an arrow "−b". Here, the tracks B1 are recorded on the unrecorded areas formed during the initial forward direction recording as described with reference to FIG. 33. FIG. 34 depicts the erasing head He2 for the erasing operation before the recording operation by the video head Hv2.

The recording operation by the video head Hv1 or Hv2 is controlled by the capstan controller 9 with the control signal reproduced from the control track of the magnetic tape T for the periods other than the recording period of initial forward direction recording of the still picture recording in the reciprocating recording.

Figure 35:
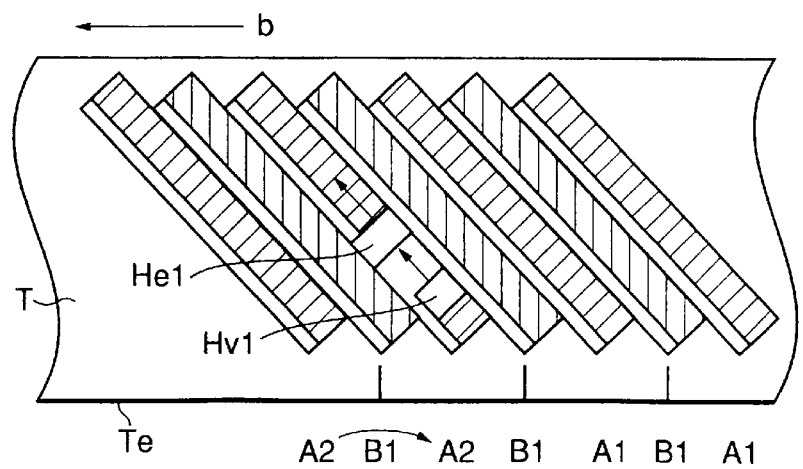
FIG. 35 illustrates a track pattern on a magnetic tape.

FIG. 35 illustrates the second forward direction recording by the video head Hv1 after the initial reverse direction recording done by the video head Hv2. The video head used for the second forward direction recording is the video head Hv1 which was used for the initial forward direction recording.

The tracks A2 in the second forward direction recording are recorded between the tracks B1 which have been recorded in the initial reverse direction recording. The tracks A1 which have been recorded in the initial forward direction recording located between the tracks B1 are erased by the erasing head He1 before the second forward direction recording by the video head Hv1.

As described above, the preceding erasing for the (2m+1)-th recording period by the rotary erasing head He1 or He2 is applied only to the tracks recorded for the (2m−1)-th recording period, and the preceding erasing for the (2m+2)-th recording period is applied only to the tracks recorded for the 2m-th recording period in the continuous reciprocating recording, where "m" is a natural number.

A reproducing operation of the magnetic recording and reproducing apparatus according to the present invention is executed under the state where the rotary loci of the rotary magnetic heads match the tracks recorded on the magnetic tape T under the control of the slant controller 7 while travelling at a specific speed in a specific direction.

A recorded signal which has been recorded by the video head Hv1 in the forward direction recording is reproduced by the video head Hv1 as a reproduced signal which is stored in a field memory. The reproduced signal stored in the field memory is read therefrom while the video head Hv2 is scanning the magnetic tape T.

On the other hand, a recorded signal which has been recorded by the video head Hv2 in the reverse direction recording is reproduced by the video head Hv2 as a reproduced signal which is also stored in the field memory. The reproduced signal stored in the field memory is read therefrom while the video head Hv1 is scanning the magnetic tape T.

FIG. 6 illustrates the rotary magnetic head arrangement on the upper drum Du in that the video heads Hv11 and Hv22 are arranged with 180 degree symmetry; the erasing heads He1 and He2 are arranged with 180 degree symmetry and having 45 degree angular positional relationship with the video heads Hv11 and Hv22 with respect to the center shaft 12; and the video heads Hv21 and Hv12 are provided adjacent to the video heads Hv11 and HV22, respectively. The video heads Hv11 and Hv12 have the same azimuth angle. Further, the video heads Hv21 and Hv22 have the same azimuth angle, however, different from that of the video heads Hv11 and Hv12.

A reproducing operation of the magnetic recording and reproducing apparatus according to the present invention is executed to the magnetic tape T recorded by the reciprocating recording with rotary magnetic heads shown in FIG. 6 where sequential tracks recorded by the forward direction recording are scanned by the video heads Hv11 and Hv12 to generate a reproduced signal, and sequential tracks recorded by the reverse direction recording are scanned by the video heads Hv21 and Hv22 to generate a reproduced signal.

According to the present invention, as described above, a time-lapse type VTR system in which data are rewritten from the oldest data can be applied to the present standard VTR with the same recording density as the standard recording in endless recording by reciprocating recording, without drastic design modification to the present standard VTR, the present invention thus providing a VTR with a variety of functions.

What is claimed is:

1. An apparatus comprising:
   a rotary drum on which at least a first and a second rotary magnetic head are mounted with 180 degree-symmetry with respect to a center shaft of the rotary drum, the first rotary magnetic head having a magnetic gap set with an azimuth angle of 90 degrees or less in a clockwise direction with respect to a track width direction on a magnetic tape on which at least a video signal is to be recorded, and the second rotary magnetic head having a magnetic gap set with an azimuth angle of 90 degrees or less in an anticlockwise direction with respect to the track width direction; and
   a first controller for sequentially and selectively recording at least a video signal on the magnetic tape to repeatedly record, by the first rotary magnetic head, a track of the video signal on the magnetic tape while stopped after intermittent transfer by a distance corresponding to a two track-width in a first direction, and to repeatedly record, by the second rotary magnetic head, another track of the video signal on the magnetic tape while stopped after intermittent transfer by the distance corresponding to a two-track width in a second direction opposite to the first direction.

2. The apparatus as in claim 1 further comprising:
   a second controller for sequentially and selectively recording at least the video signal on the magnetic tape to repeatedly record, by the first rotary magnetic head, first tracks each corresponding to one picture video signal on the magnetic tape while being continuously travelling at a speed V/n in the first direction, and to repeatedly record, by the second rotary magnetic head, second tracks each corresponding to one picture video signal on the magnetic tape so that one of the second tracks is sandwiched between the two of the first tracks while the magnetic tape is continuously travelling at the speed V/n in the second direction, where V is a predetermined speed and n is a natural number; and
   means for switching the first and second controllers.

3. The apparatus as in claim 2 further comprising a first and a second rotary erasing head, the first rotary erasing head being mounted on the rotary drum in the vicinity of the first rotary magnetic head at the same height, the first rotary erasing head conducting erasing before recording by the first rotary magnetic head, the second rotary erasing head being mounted on the rotary drum in the vicinity of the second rotary magnetic head at the same height, the second rotary erasing head conducting erasing before recording by the second rotary magnetic head.

4. The apparatus as in claim 3, wherein the first rotary erasing head has the same head track width as that of the first rotary magnetic head, and second rotary erasing head has the same head track width as that of the second rotary magnetic head.

5. The apparatus as in claim 3, wherein the first and second rotary erasing heads are mounted on the drum with 180 degree-symmetry with respect to the center shaft of the rotary drum, the first and second rotary erasing heads having a head track width narrower than another head track width of the first and second rotary magnetic heads.

6. The apparatus as in claim 2 further comprising a first and a second rotary erasing head mounted on the rotary drum with 180 degree-symmetry, the first rotary erasing head conducting erasing before recording by the first rotary magnetic head, the second rotary erasing head conducting erasing before recording by the second rotary magnetic head, the first and second rotary magnetic heads having a head track width (Tp−Tp·θ/180) times a head track width of the first and second rotary erasing heads where θ is a center angle of the center shaft of the rotary drum with respect to a positional relationship between the first rotary magnetic head and the first rotary erasing head and Tp is a head track width of the first and second rotary magnetic heads, Tp being predetermined for recording to be conducted while the magnetic tape is continuously travelling at the speed V, the first and second rotary magnetic heads being mounted on the rotary drum with the same height at their center, the first and second rotary erasing heads being mounted on the rotary drum so that a portion of each rotary erasing head matches an edge of a track on the magnetic tape recorded by the first rotary magnetic head.

7. The apparatus as in claim 1, further comprising means for varying an angle between a locus of each rotary magnetic head and a reference edge of the magnetic tape.

8. The apparatus as in claim 1, further comprising:
   a fixed drum provided coaxially with the rotary drum;
   a first driver to incline center shafts of the rotary and fixed drums by an angle so that rotary loci of the first and second magnetic heads match the track recorded on the magnetic tape;
   a positional restricting member provided as close to the fixed drum, the positional restricting member restricting a position of a reference edge of the magnetic tape; and
   a second driver to incline the positional restricting member to match the reference edge of the magnetic tape.

9. The apparatus as in claim 2, further comprising a first and a second rotary erasing head, the first rotary erasing head erasing only a track recorded for (2m−1)-th recording period before (2m+1)-th recording period, the second rotary erasing head erasing only another track recorded for 2m-th recording period before (2m+2)-th recording period, where m is a natural number indicating a recording order after the magnetic tape is continuously travelling in the first or the second direction.

10. An apparatus comprising:
    a rotary drum on which at least a first and a second rotary magnetic head are mounted with 180 degree-symmetry with respect to a center shaft of the rotary drum, the first rotary magnetic head having a magnetic gap set with an azimuth angle of 90 degrees or less in a clockwise direction with respect to a track width direction on a magnetic tape on which at least a video signal is to be recorded, and the second rotary magnetic head having a magnetic gap set with an azimuth angle of 90 degrees or less in an anticlockwise direction with respect to the track width direction; and
    a controller for sequentially and selectively recording at least the video signal on the magnetic tape to repeatedly record, by the first rotary magnetic head, first tracks each corresponding to one picture video signal on the magnetic tape while continuously travelling at a speed V/n in a first direction, and to repeatedly record, by the second rotary magnetic head, second tracks each corresponding to one picture video signal on the magnetic tape so that one of the second tracks is sandwiched between the two of the first tracks while the magnetic tape is continuously travelling at the speed V/n in a second direction opposite to the first direction, where V is a predetermined speed and n is a natural number and further comprising:
    a fixed drum provided coaxially with the rotary drum;
    a first driver to incline center shafts of the rotary and fixed drums by an angle so that rotary loci of the first and second magnetic heads match the track recorded on the magnetic tape;
    a positional restricting member provided as close to the fixed drum, the positional restricting member restricting a position of a reference edge of the magnetic tape; and
    a second driver to incline the positional restricting member to match the reference edge of the magnetic tape.

* * * * *